US009413882B2

(12) United States Patent
Gisby et al.

(10) Patent No.: US 9,413,882 B2
(45) Date of Patent: Aug. 9, 2016

(54) SYSTEM AND METHOD FOR ENABLING ENCRYPTED VOICE COMMUNICATIONS BETWEEN AN EXTERNAL DEVICE AND TELEPHONY DEVICES ASSOCIATED WITH AN ENTERPRISE NETWORK

(75) Inventors: Douglas Gisby, Redwood City, CA (US); Theron Dodson, Boston, MA (US); David Yach, Waterloo (CA); Michael Gray, Sherman Oaks, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 873 days.

(21) Appl. No.: 12/394,229

(22) Filed: Feb. 27, 2009

(65) Prior Publication Data

US 2010/0220850 A1  Sep. 2, 2010

(51) Int. Cl.
*H04M 3/42* (2006.01)
*H04K 1/00* (2006.01)
(Continued)

(52) U.S. Cl.
CPC ............ *H04M 3/42314* (2013.01); *H04K 1/00* (2013.01); *H04L 63/061* (2013.01); *H04L 63/0428* (2013.01); *H04L 65/1069* (2013.01); *H04M 7/1205* (2013.01); *H04M 2203/609* (2013.01)

(58) Field of Classification Search
CPC .................... H04M 2203/609; H04M 7/0078; H04M 7/006; H04M 1/2535; H04M 1/68; H04M 3/205; H04M 3/42008; H04L 12/4641; H04L 63/0428; H04L 63/0823; H04L 12/4625; H04L 49/354; H04L 65/403; H04L 63/126; H04L 2209/127; H04L 2209/80; H04L 63/0869
USPC ........... 379/211, 225, 231, 232, 93.01, 93.02, 379/93.07, 93.09, 93.11; 380/256, 267, 380/259, 260, 270, 271, 280; 370/352, 353, 370/354, 355, 356, 357; 455/556; 713/189
See application file for complete search history.

(56) References Cited

U.S. PATENT DOCUMENTS 5,329,578 A * 7/1994 Brennan et al. ........... 379/211.03
5,579,394 A * 11/1996 Waldron et al. ............... 713/153
(Continued)

FOREIGN PATENT DOCUMENTS

CA         2694503        8/2010
EP         2224668        9/2010
WO    WO 2008155546 A1 * 12/2008

OTHER PUBLICATIONS

European Search Report. Application No. 09154036.9. Dated: Sep. 14, 2009.
(Continued)

*Primary Examiner* — Khai N Nguyen
*Assistant Examiner* — Kharye Pope
(74) *Attorney, Agent, or Firm* — Fish & Richardson P.C.

(57) ABSTRACT

A telecommunication system that can selectively establish communications with one of a plurality of telephony devices associated with a particular telephone number for a device in an enterprise network. More particularly, the system is configured to route an incoming telephone call received from an external device, such as a mobile device for example, to one or more of a plurality of telephony devices associated with the telephone number. The plurality of telephony devices may include personal digital assistants and other remote devices. In one embodiment, the system comprises a network server configured to connect the incoming telephone call from an external device to a telephony device, where voice communications are encrypted for transmission by the network server to the external device from which the incoming telephone call is received, and encrypted voice communications received from the external device can be decrypted, re-encrypted and/or stored by the network server if required.

15 Claims, 26 Drawing Sheets

(51) Int. Cl.
*H04L 12/66* (2006.01)
*H04L 29/06* (2006.01)
*H04M 7/12* (2006.01)

(56) References Cited

U.S. PATENT DOCUMENTS

| | | | |
|---|---|---|---|
| 7,000,121 B2* | 2/2006 | Jarosz | H04L 43/10 |
| | | | 713/151 |
| 7,418,596 B1* | 8/2008 | Carroll | H04L 63/068 |
| | | | 380/247 |
| 7,831,722 B2* | 11/2010 | Holden | G06F 21/31 |
| | | | 709/225 |
| 7,965,701 B1* | 6/2011 | Toennis et al. | 370/352 |
| 2002/0029258 A1 | 3/2002 | Mousseau et al. | |
| 2003/0061496 A1* | 3/2003 | Ananda | 713/189 |
| 2003/0063733 A1* | 4/2003 | Levine et al. | 379/211.04 |
| 2003/0228011 A1* | 12/2003 | Gibson | 379/211.02 |
| 2004/0068649 A1* | 4/2004 | Haller et al. | 713/153 |
| 2004/0161086 A1 | 8/2004 | Buntin et al. | |
| 2004/0179689 A1* | 9/2004 | Maggenti et al. | 380/270 |
| 2004/0268148 A1* | 12/2004 | Karjala | H04L 41/0806 |
| | | | 726/15 |
| 2005/0025315 A1* | 2/2005 | Kreitzer | 380/270 |
| 2005/0069121 A1* | 3/2005 | Faruque et al. | 379/225 |
| 2005/0163316 A1 | 7/2005 | Wing | |
| 2005/0201362 A1* | 9/2005 | Klein et al. | 370/352 |
| 2005/0210235 A1* | 9/2005 | Best et al. | 713/156 |
| 2005/0273850 A1* | 12/2005 | Freund | H04L 63/0227 |
| | | | 726/14 |
| 2006/0077972 A1* | 4/2006 | Lee | 370/356 |
| 2006/0277406 A1* | 12/2006 | Hashimoto | H04L 63/029 |
| | | | 713/168 |
| 2006/0282889 A1* | 12/2006 | Brown et al. | 726/15 |
| 2007/0027921 A1* | 2/2007 | Alvarado | G06Q 10/109 |
| 2007/0127448 A1* | 6/2007 | Buntin et al. | 370/356 |
| 2007/0154005 A1* | 7/2007 | Daigle | 379/211.04 |
| 2007/0177578 A1* | 8/2007 | Anspach et al. | 370/352 |
| 2007/0190977 A1* | 8/2007 | Fok et al. | 455/411 |
| 2007/0206738 A1* | 9/2007 | Patel et al. | 379/93.24 |
| 2008/0098221 A1* | 4/2008 | Hashimoto | G06Q 20/3674 |
| | | | 713/169 |
| 2008/0126794 A1 | 5/2008 | Wang et al. | |
| 2009/0006844 A1* | 1/2009 | Wing et al. | 713/156 |
| 2009/0122984 A1* | 5/2009 | Fascenda et al. | 380/247 |
| 2009/0279533 A1* | 11/2009 | Strebel et al. | 370/352 |
| 2009/0327703 A1* | 12/2009 | Feudo et al. | 713/156 |
| 2010/0077204 A1* | 3/2010 | Kawano | H04L 63/06 |
| | | | 713/153 |
| 2010/0080383 A1* | 4/2010 | Vaughan | H04L 9/0827 |
| | | | 380/44 |
| 2010/0166178 A1* | 7/2010 | Berggren et al. | 380/42 |
| 2010/0166182 A1* | 7/2010 | Berggren et al. | 380/257 |
| 2010/0332827 A1* | 12/2010 | Garcia et al. | 713/168 |
| 2011/0135093 A1* | 6/2011 | Radatti | 380/257 |

OTHER PUBLICATIONS

Examination Report. Application No. 09154036.9. Dated: Mar. 28, 2011.
Rosenberg J. et al "SIP: Session Initiation Protocol", Jun. 1, 2002; Jun. 00, 2002, pp. 1-269, XP015009039.
European Patent Application Response filed Nov. 16, 2009, in corresponding European patent application No. 09154036.9.
European Patent Application Response filed Jul. 20, 2011, in corresponding European patent application No. 09154036.9.
Office Action mailed Apr. 3, 2012, in corresponding Canadian patent application No. 2,694,503.
Examination Report mailed May 8, 2012, in corresponding European patent application No. 09154036.9.
Response filed on Aug. 28, 2012, in corresponding European patent application No. 09154036.9.
Notice of Allowance mailed Sep. 5, 2013, in corresponding Canadian Patent Application No. 2,694,503.
European Communication under Rule 71(3) for European Patent Application No. 09154036.9, dated Dec. 4, 2013.
Decision to grant a European patent pursuant to Article 97(1) EPC mailed Apr. 17, 2014; in European patent application No. 09154036.9.

* cited by examiner

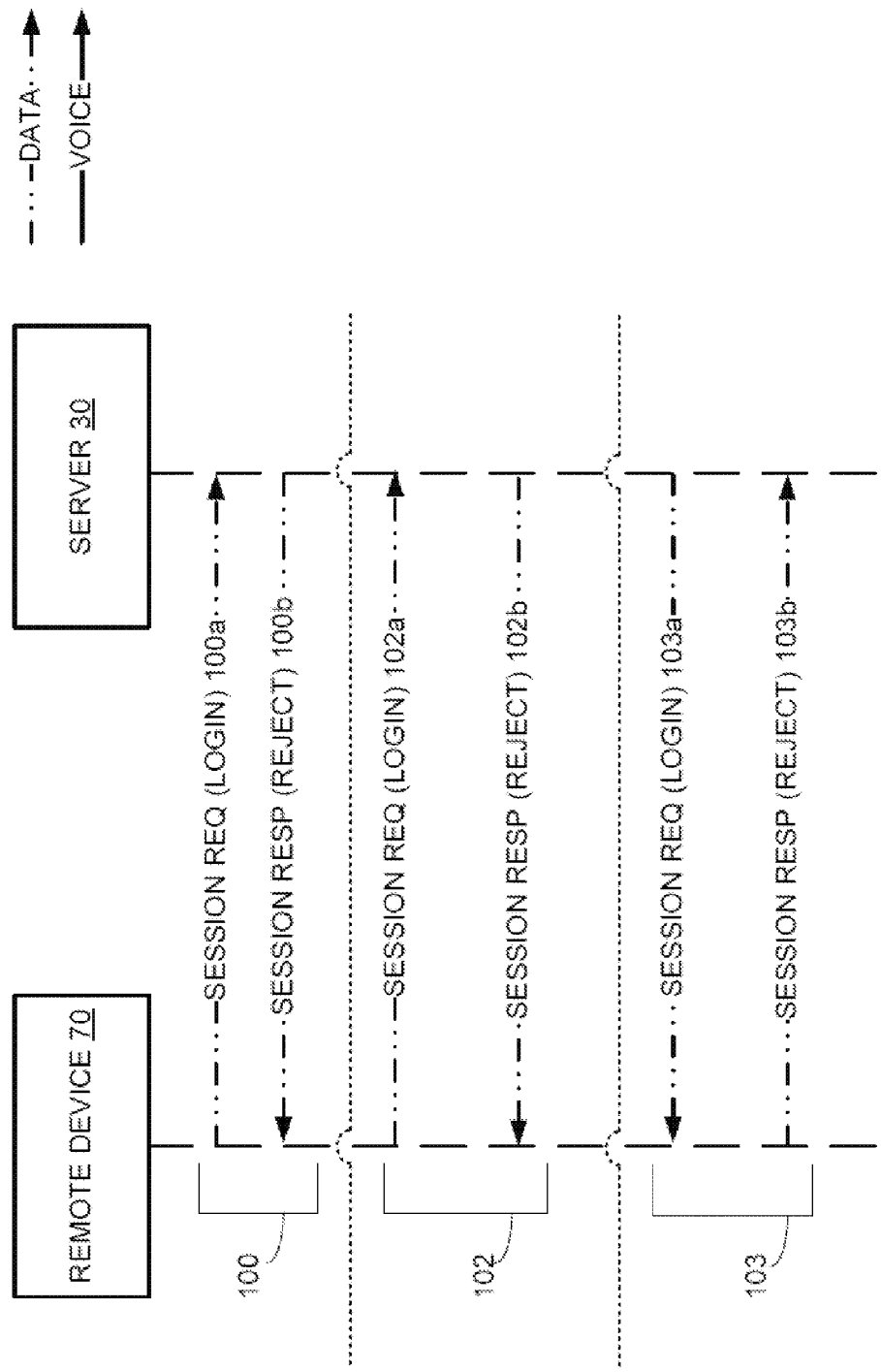

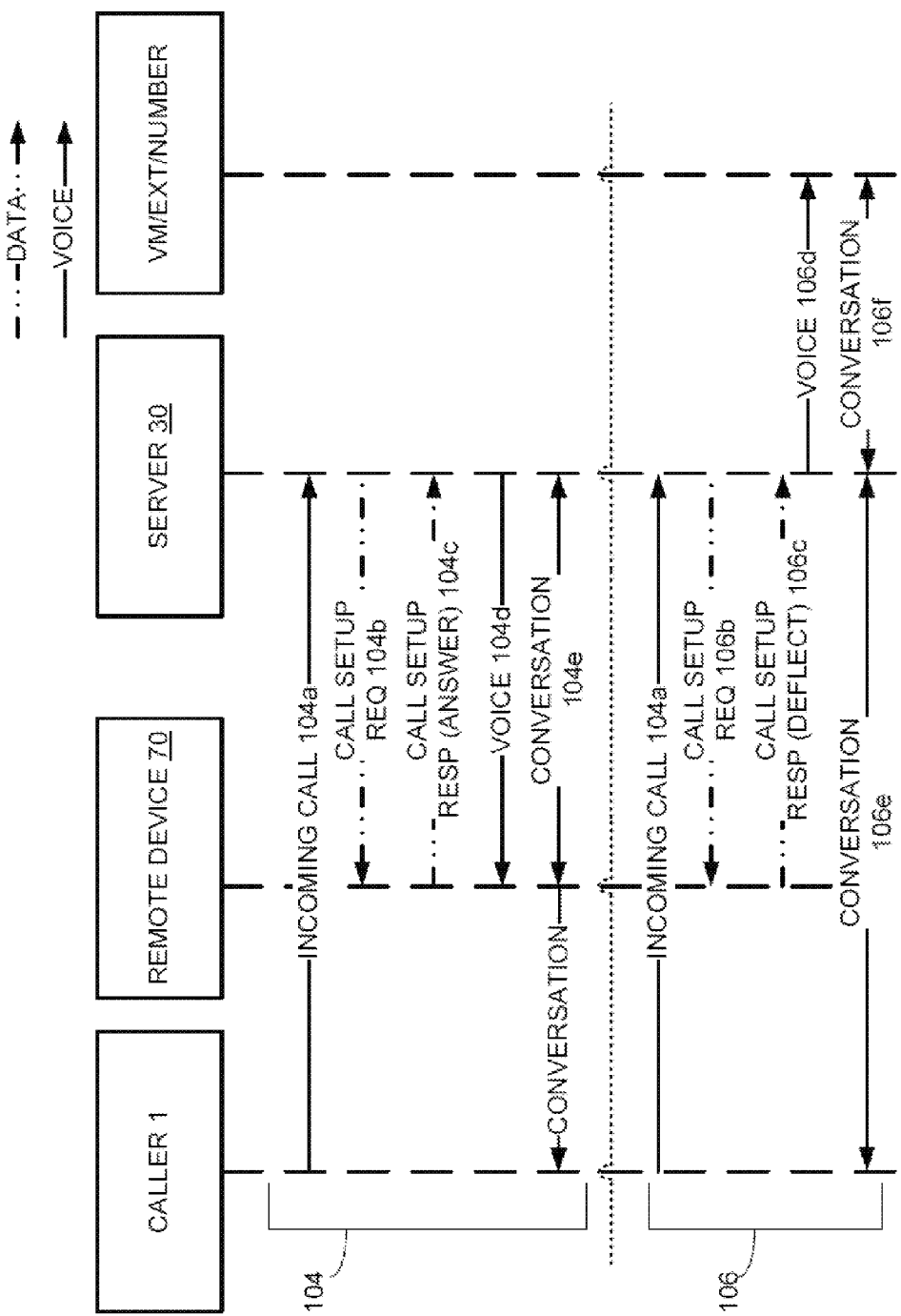

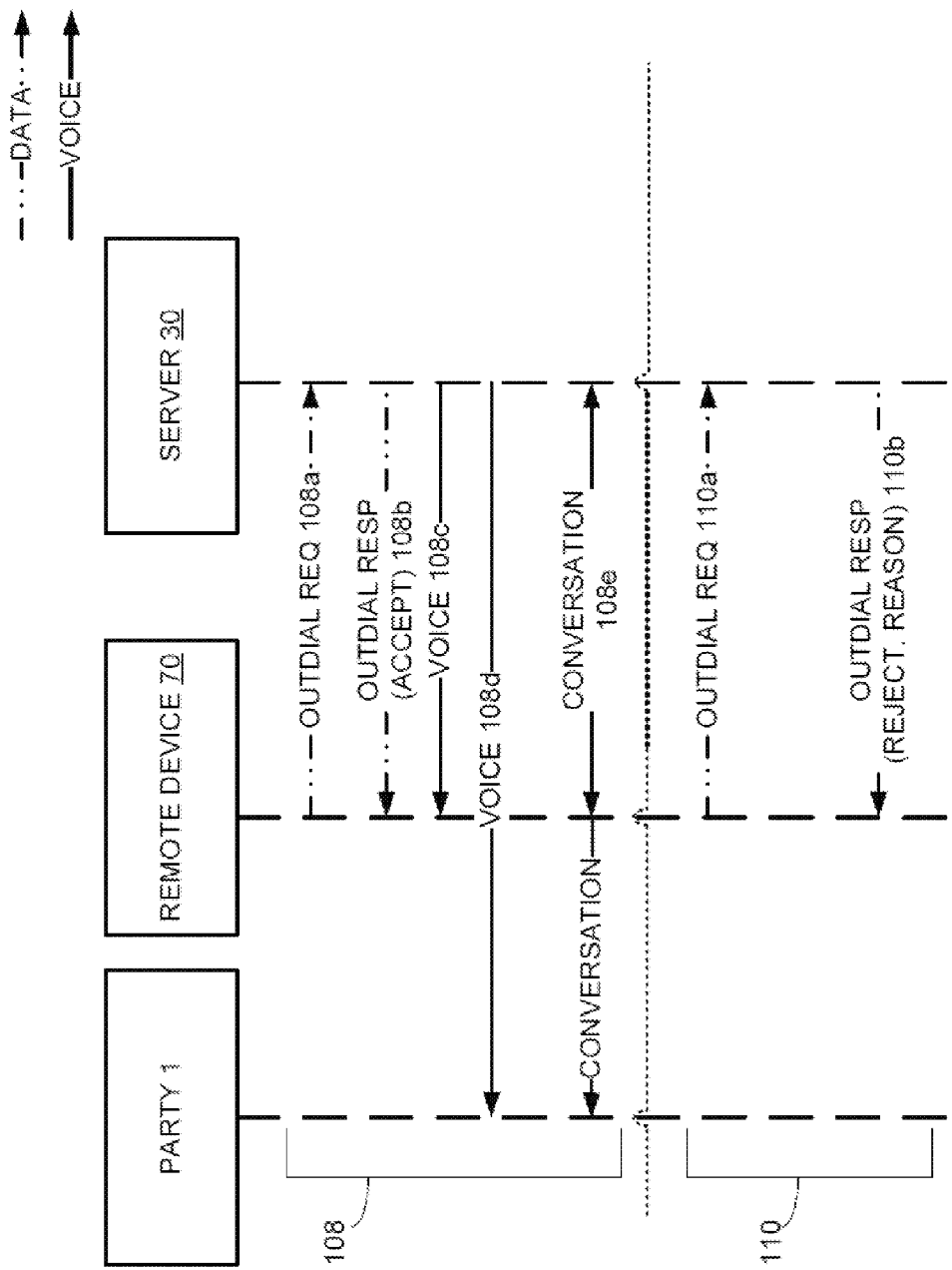

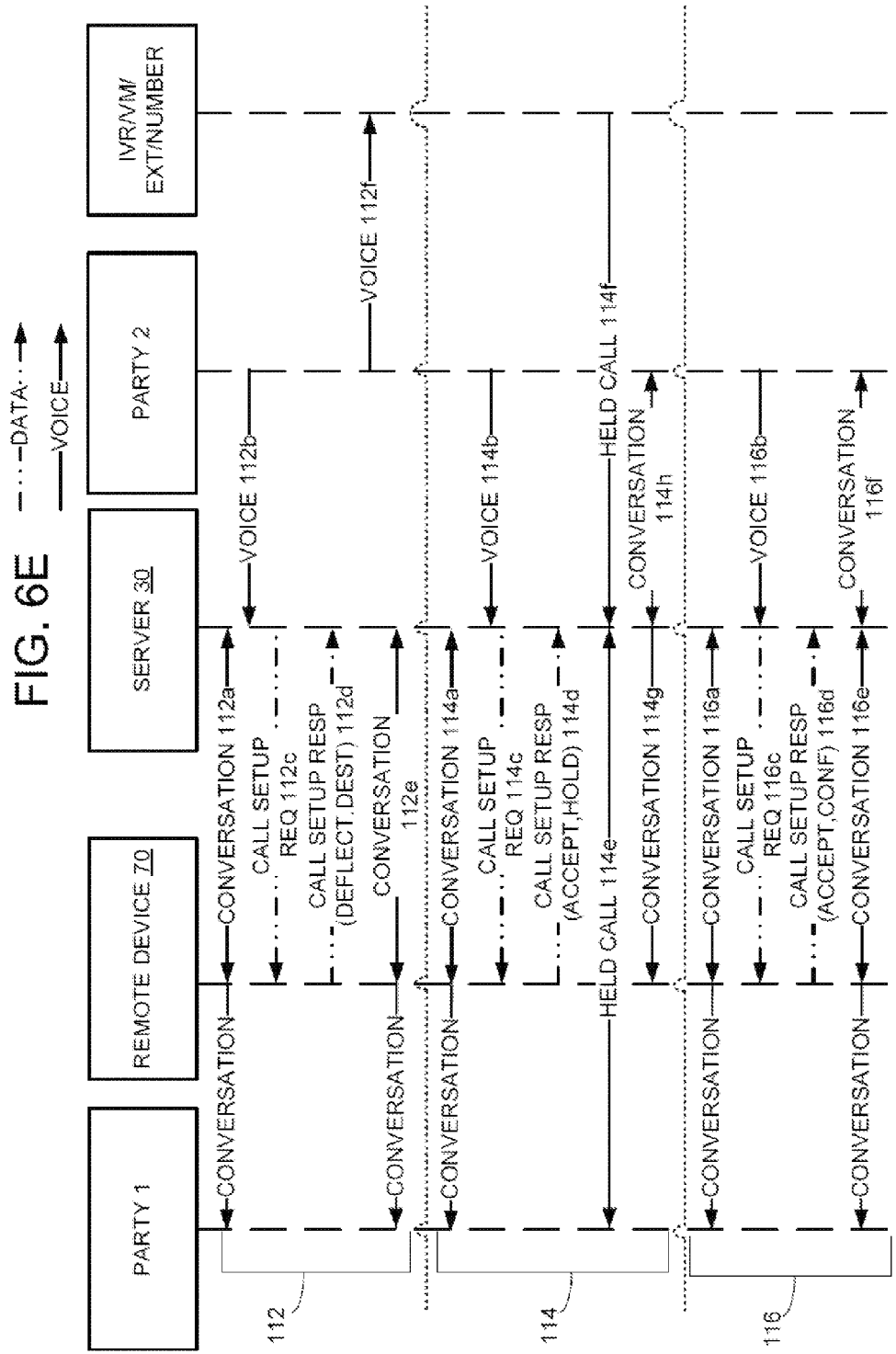

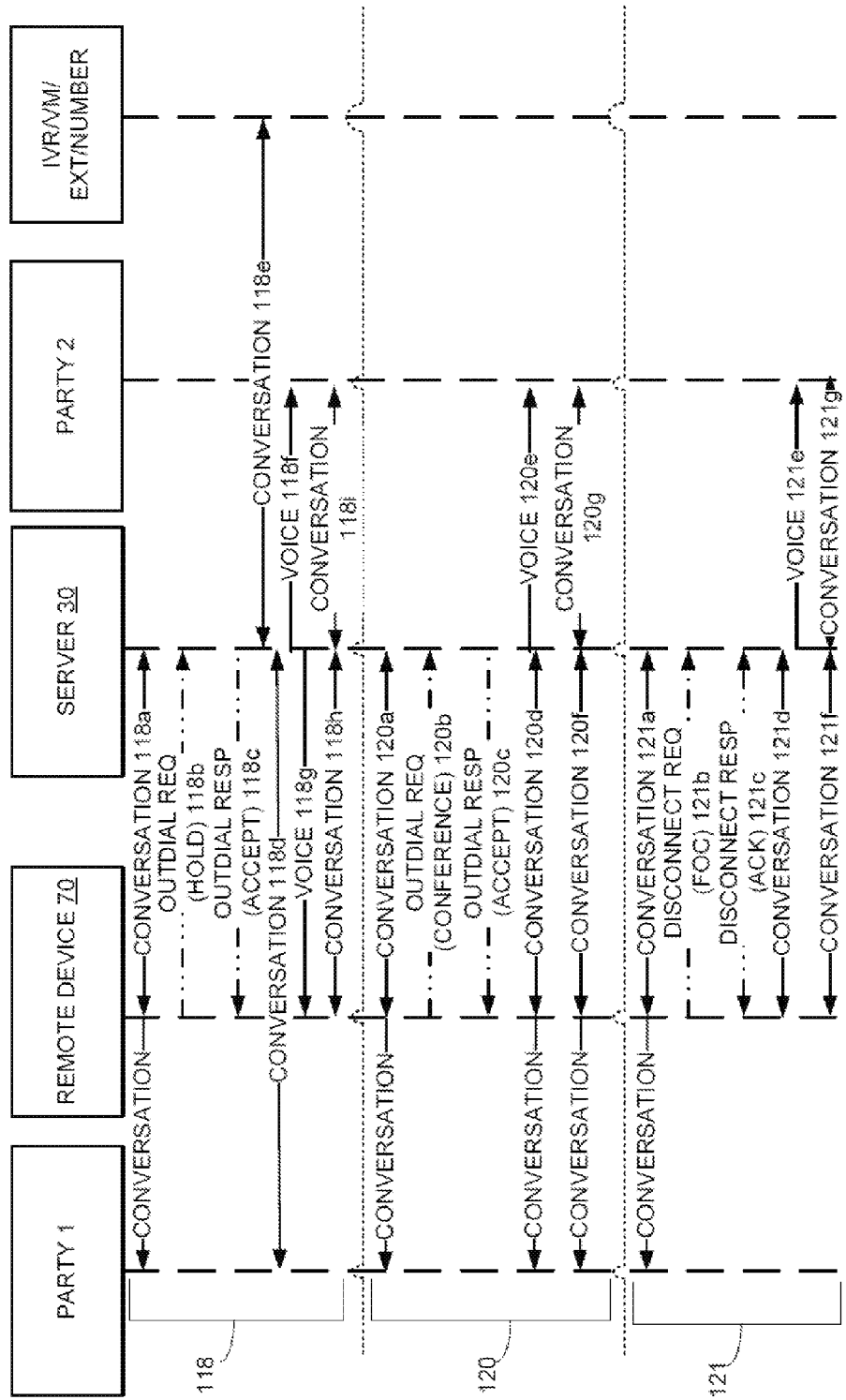

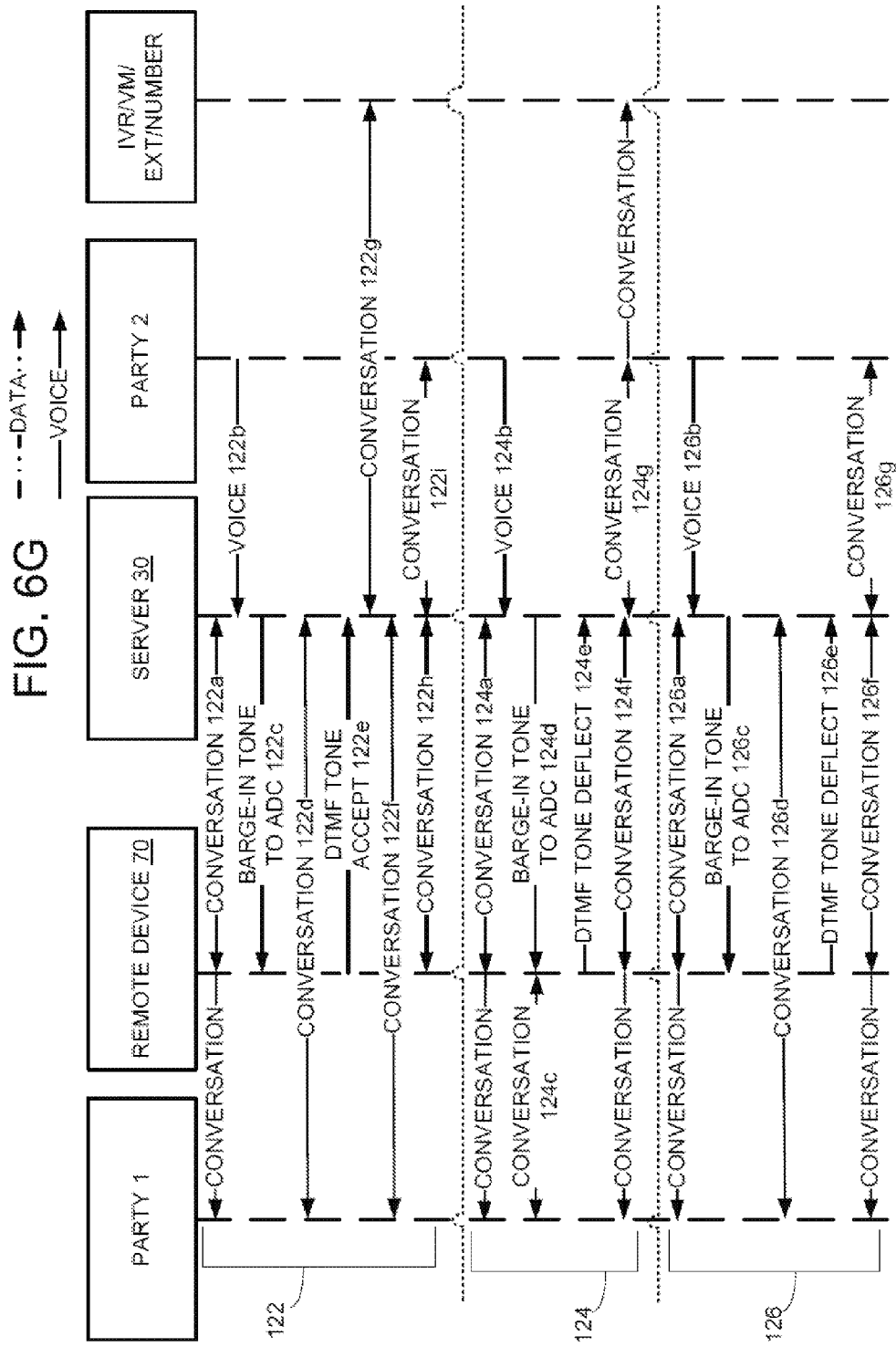

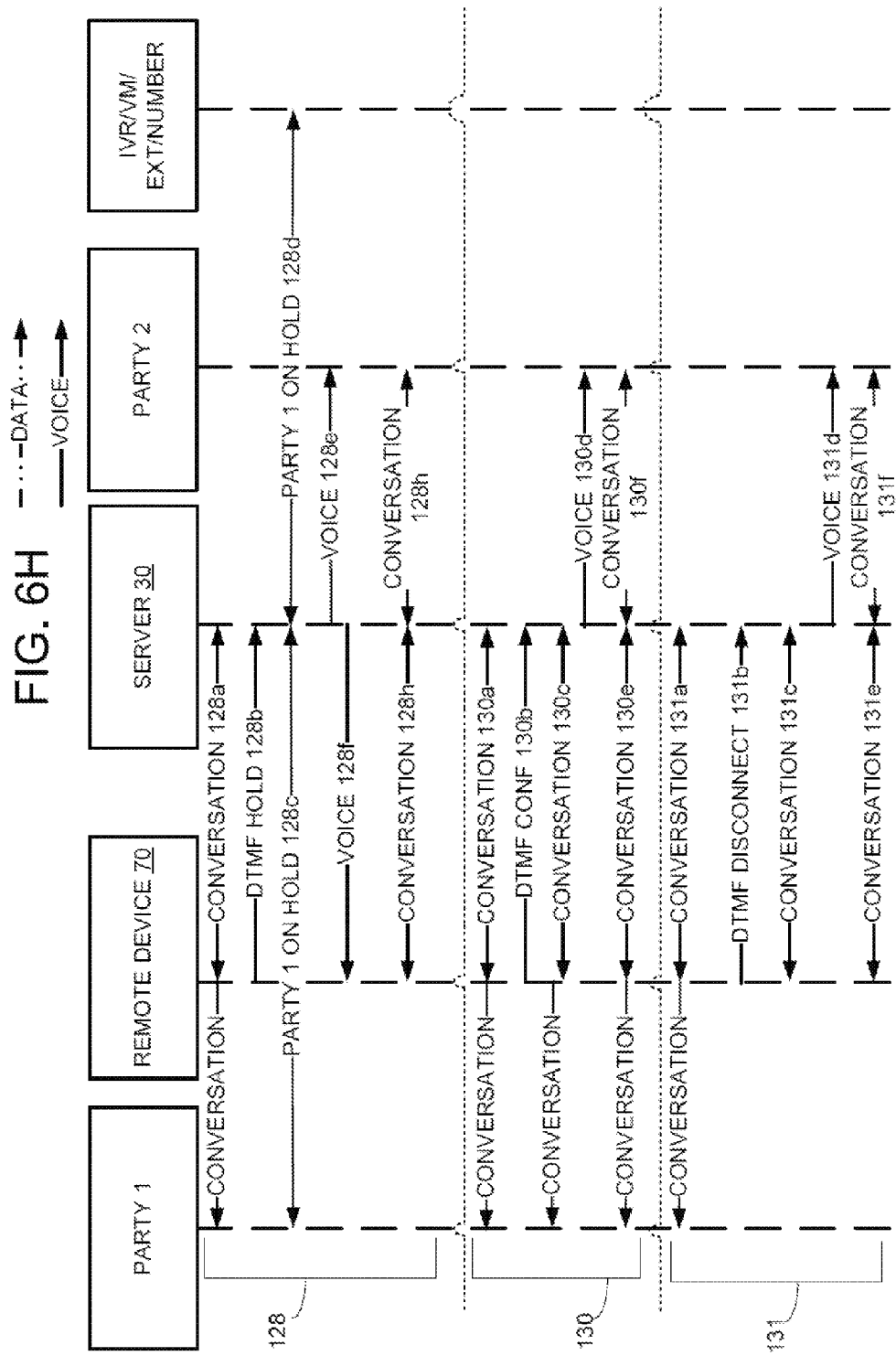

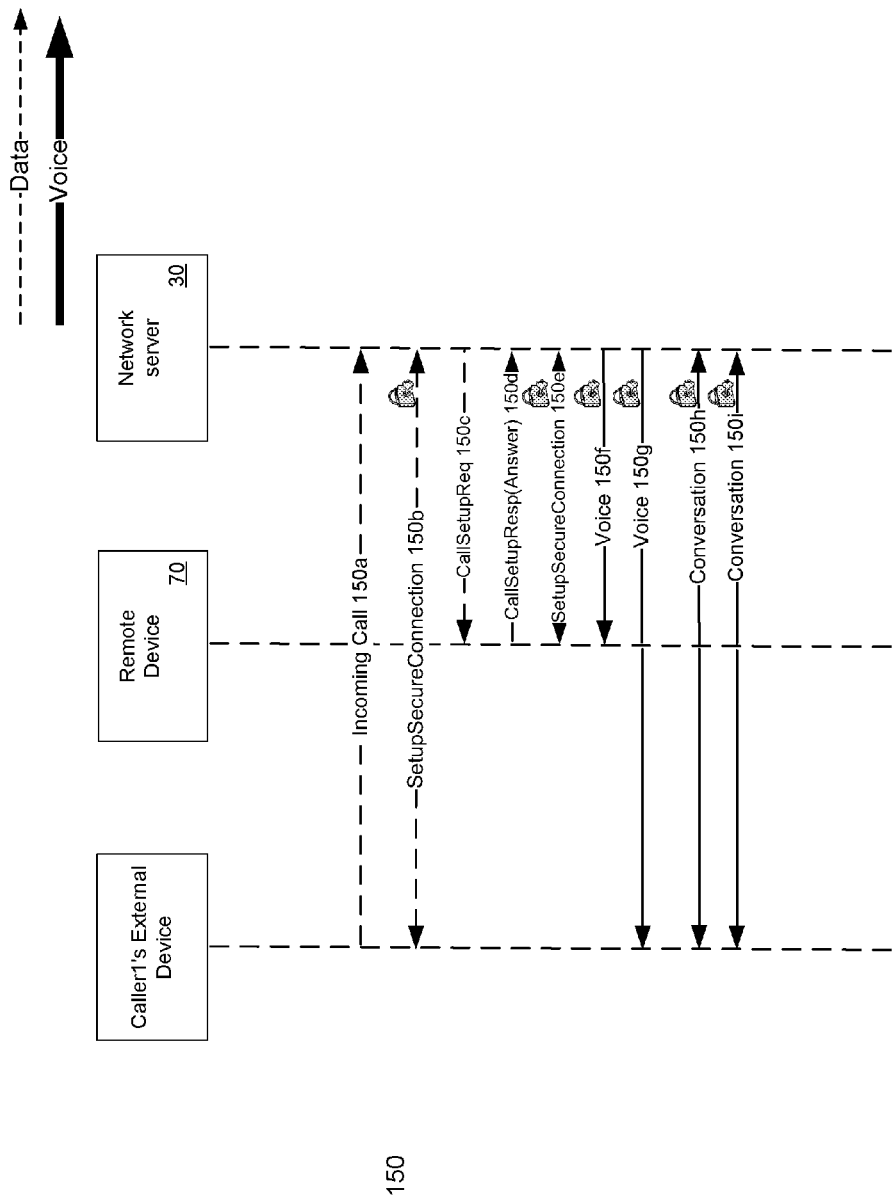

SYSTEM AND METHOD FOR ENABLING ENCRYPTED VOICE COMMUNICATIONS BETWEEN AN EXTERNAL DEVICE AND TELEPHONY DEVICES ASSOCIATED WITH AN ENTERPRISE NETWORK

BACKGROUND

In an office building or other enterprise establishment, personnel may be assigned to offices with each office having an associated telephone. The office telephones are typically connected to a private branch exchange (PBX) or other exchange or call processing infrastructure. A PBX is a private telephone network that allows each office telephone to have its own telephone extension, typically a three, four or five digit telephone number where station-to-station (i.e., office-to-office) calls can be placed by dialing the three, four or five digit extension. A direct inward dial (DID) telephone number is also typically associated with each office telephone that allows calls initiated outside of the PBX to be placed directly to the office telephone.

Typically, calls made within an enterprise between office telephones are generally considered to be secure. These particular telephony devices are generally coupled to each other within a wired network, which is usually established within a single building or that spans several buildings in close proximity, for example. Certain physical safeguards may be implemented to prevent unauthorized access to the wired network, and accordingly, calls between office telephones are generally considered to take place within a trusted domain. In cases where an enterprise uses wireless networks such as WiFi, as part of its network, physical safeguards such as shielding and wireless range control can also be used to hinder unauthorized access.

In contrast, communications that involve external devices that connect to an enterprise's network from the outside, such as mobile device communications (e.g. cellular telephone communications) established through a mobile carrier's cellular towers, or communications established through a local phone company's network or a Wide Area Network (WAN) such as the Internet, are generally not considered secure, as they typically take place over networks outside an enterprise's control where communications may be more easily intercepted by third parties. Accordingly, many organizations and institutions have instituted policies that govern what information employees should and should not communicate by voice when using an external device, due to internal and regulatory restrictions.

Greater security when using external devices for voice communications may be desirable. In one known system, each of a plurality of external devices may be provided with a client application comprising an encryption module. At one external device, the encryption module is configured to encrypt outgoing voice communication data originating from that external device for transmission to another of the plurality of external devices also equipped with the encryption module. At the other external device, the encryption module is configured to decrypt incoming encrypted voice communication data. Encryption and decryption of voice communication data for transmission in the reverse direction is typically also performed. This system facilitates more secure voice communications between the external devices.

BRIEF DESCRIPTION OF THE DRAWINGS

For a better understanding of embodiments of the systems and methods described herein, and to show more clearly how they may be carried into effect, reference will be made, by way of example, to accompanying drawings in which:

FIGS. 6A-6H show line flow diagrams illustrating various operations performed by example embodiments;

FIGS. 6I-6J show line flow diagrams illustrating various operations performed by other example embodiments;

DETAILED DESCRIPTION

Figure 1:
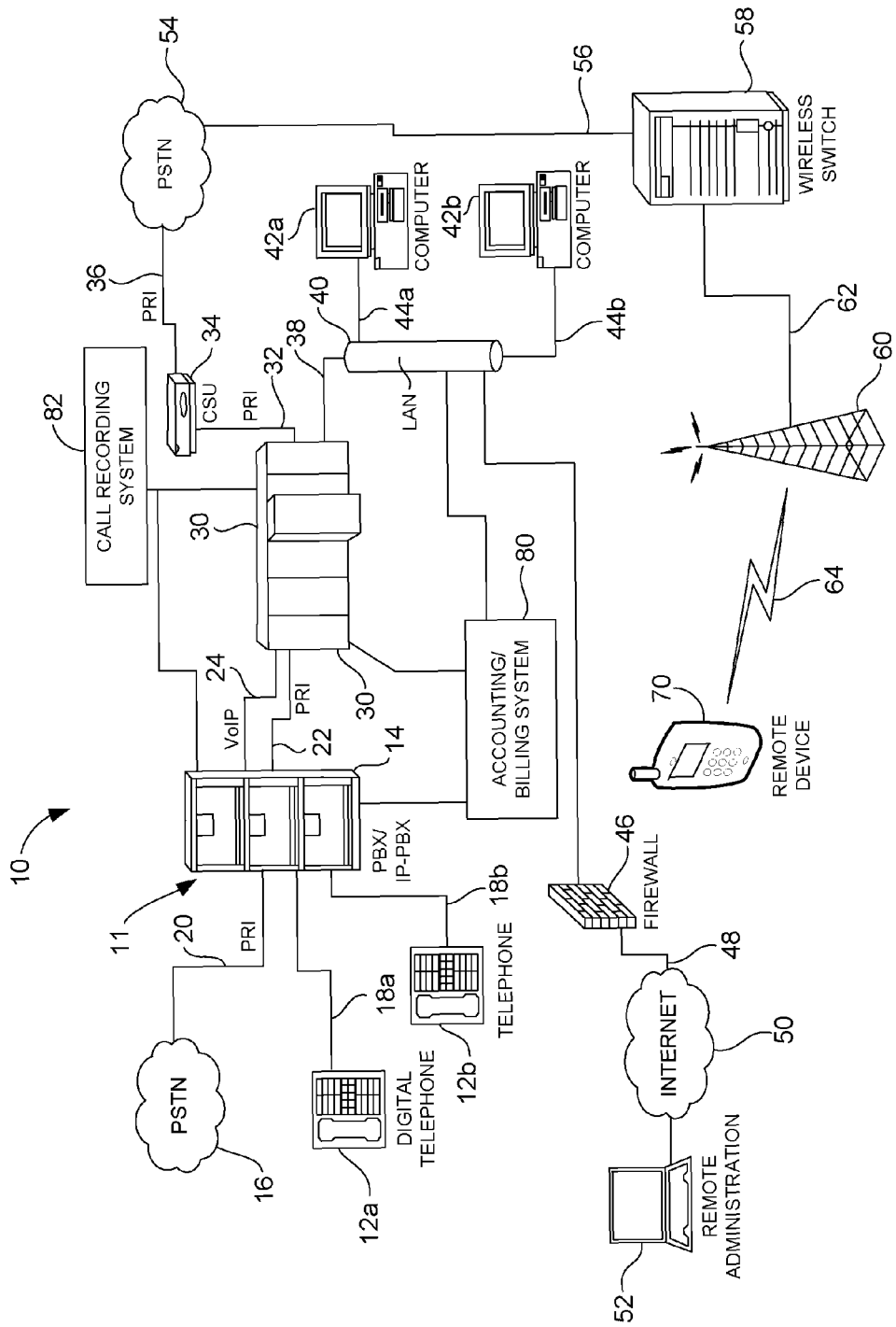
FIG. 1 illustrates an example of a telecommunication system in accordance with at least one embodiment.

As noted above, in one known system, each of a plurality of external devices may be provided with a client application comprising an encryption module, which facilitates encrypted voice communications between the mobile devices. However, this known system is not configured to facilitate secure voice communications between, for example, one of the external devices and other devices for which the encryption module is not provided. In particular, voice communications between an external device and an office telephone or other telephony device operating within a PBX would not be secured. As a further example, voice communication data transmitted between one external device and another external device that is not directly connected thereto (e.g. where communications are to be routed via a PBX) may also not be secured.

As the demand for and usage of external devices such as mobile devices increase, a system configured to facilitate more secure voice communications between external devices may be desirable. Moreover, a system to facilitate more secure voice communications between telephony devices considered to be within a secure domain (e.g. an enterprise network) and one or external devices outside of the secure domain, for example, may also be desirable.

In one broad aspect, there is provided a method of facilitating encrypted voice communications between an external device (e.g. a mobile device) and at least one telephony device associated with a primary telephone number for a device in an enterprise network, the method comprising: detecting an incoming telephone call from a first external device to the primary telephone number at a network server; and connecting the incoming telephone call to a telephony device associated with the primary telephone number via a first voice connection path between the network server and the first external device and a second voice connection path between the network server and the telephony device associated with the primary telephone number; said connecting comprising receiving first voice communication signals via the second voice connection path at the network server and transmitting the first voice communication signals to the first external device in encrypted form via the first voice connection path, and receiving second voice communication signals from the first external device in encrypted form via the first voice connection path at the network server and transmitting the second voice communication signals to the telephony device associated with the primary telephone number via the second voice connection path.

In another broad aspect, the first and second voice communication signals transmitted via the second voice connection path are in decrypted form.

In another broad aspect, the first and second voice communication signals transmitted via the second voice connection path are in encrypted form.

These and other aspects and features of various embodiments will be described in greater detail below.

It has become relatively common for individuals to possess a number of different devices through which they communicate. For example, a person may have a home telephone, a wireless telephone, a pager, a personal digital assistant (PDA), and an office telephone to name a few. As the population becomes increasingly mobile, making contact with a person through one of these communication devices has become more difficult.

Call forwarding is one method of addressing this problem. Certain telephone systems allow users to enter another number to which a call is forwarded if not answered by a specified number of rings. This should allow an individual with multiple telephone devices to forward the call to such devices until the telephone at which the individual is located finally rings. However, if several telephones are involved, this approach becomes complicated. Moreover, it requires the calling party to remain on the line for a significant period of time if the call is to be forwarded multiple times. Furthermore, it is necessary that call forwarding capabilities exist on each of the individual's telephones. In addition, this approach requires that all telephones involved be reprogrammed each time an individual desires to initiate call forwarding.

A significant drawback to this forwarding strategy is that, in each leg of the forwarded call, the calling party is terminated on the last device or network in the chain. It follows that the final number in the forwarding scheme is responsible for all available enhanced services or voicemail available to the caller. Accordingly, although a call may have been initially placed to an office telephone equipped with voicemail and/or operator assist, all such enhanced services of the corporate network are lost once the call is forwarded off the corporate PBX (e.g., to the user's wireless telephone).

Travel can also exacerbate the difficulty of establishing communication with an individual having access to multiple telephone devices. Upon checking into a hotel, the telephone in a traveler's hotel room becomes available as yet another potential means of contact. Unfortunately, this forces a calling party to decide whether to attempt to contact the traveler through his or her room telephone or other telephone device (e.g., wireless telephone or pager). If the traveler does not answer the called telephone, the calling party then must decide whether to leave a message (unaware of when, or if, the message will be retrieved) or instead attempt to reach the traveler via his or her other telephone.

Likewise, if the traveler is expecting an important call but is unsure whether it will be placed to his room telephone or wireless telephone, the traveler may feel compelled to remain within his room until the call has been received. In addition, if the traveler's wireless telephone does not support certain types of long distance calls (e.g., to various foreign countries), the traveler may be able to place certain types of calls only from his or her hotel room. The same problems arise when the traveler visits another office or enterprise having their own enterprise telecommunications network.

The office telephone is the primary point of contact of most business people. Typically, corporations invest significantly in their office telephone infrastructure, which often includes voicemail, paging and unified messaging systems. In addition, most corporations have negotiated contracts with their telephone carriers (e.g., local and long distance carriers) to ensure that they obtain the lowest possible rates for calls placed via their corporate network. However, because the corporate workforce is becoming increasingly mobile, more business people are using wireless telephones or devices to conduct their business when they are out of the office. This has resulted in corporations spending a larger portion of their telecommunications budget on wireless communications, with far less favorable negotiated rates than the rates of their corporate network. In addition, wireless communication systems often lack the enhanced conveniences (e.g., interoffice voicemail, direct extension dialing, etc.) that corporate users have come to expect in the office environment.

Embodiments described herein relate generally to a telecommunication system that can selectively establish communications with one of a plurality of telephony devices associated with a particular telephone number, and more particularly, route an incoming call to a plurality of telephony devices including smart phones and other remote devices. The system has a network server configured to send a data signal, via electronic mail or data communication for example, to one or more remote devices without any user interaction. The data signal causes the server and a remote device to execute a series of steps designed to route incoming calls based on user preferences.

In at least one example embodiment, the system further facilitates secure voice communications, particularly where the incoming call originates from an external device (e.g. a mobile device, such as a smart phone for example).

Voice communications between an external device such as a mobile device and an office telephone or other telephony device operating within a PBX are typically not encrypted in known systems, making them more susceptible to a security breach. Accordingly, in at least one example embodiment described herein, the system is configured to establish a secure channel between the external device from which an incoming call originates and a device that is not an external device (e.g. an office telephone), for example, automatically (i.e. without user intervention) after a user of the external device places the call. Other embodiments where voice communication data is transmitted to and/or received from an external device in an encoded (e.g. encrypted) form are also described herein.

Example embodiments and applications will now be described. Other embodiments may be realized and structural or logical changes may be made to the disclosed embodiments without departing from the spirit or scope of the embodiments described herein. Although the embodiments disclosed herein have been particularly described as applied to a business or office environment, it should be readily apparent that the embodiments may be implemented for any use or application having the same or similar problems.

Embodiments described herein relate generally to a telecommunication system that can selectively establish communications with one of a plurality of telephony devices associated with a particular telephone number (also referred to herein in the description and in the claims as a "primary telephone number"). Moreover, the system allows remote devices to perform as a functional standard office telephone for both inbound and outbound communications. The system also has a processor configured to send a data signal via electronic mail (email), text messaging, or other forms of data communications to one or more remote devices without any user interaction. The data signal causes a processor and a remote device to execute a series of steps designed to route incoming and outgoing calls based on user preferences and perform PBX functions from the remote device.

A first example embodiment is discussed and illustrated with reference to its implementation within an office building, multiple office buildings or other enterprise establishment. In an office building, for example, personnel are assigned to offices (or cubicles) with each office having an associated telephone. The office telephones are typically connected to a PBX, or other exchange or call processing infrastructure. The PBX allows each office telephone to have its own telephone extension and a direct inward dial (DID) telephone number. As known in the art, a telephone extension is typically a three, four or five digit telephone number where station-to-station (i.e., office-to-office) calls can be placed by dialing the three, four or five digit extension. This is commonly referred to as direct extension dialing. As also known in the art, a DID telephone number allows external calls (i.e., calls initiated outside of the office PBX) to be placed directly to the office telephone. The telephony devices and other devices locally (and typically physically) connected to the PBX, including the office telephones for instance, may be considered to collectively constitute an enterprise network.

However, it will be understood that while reference is made herein to an enterprise network that comprises office telephones in example embodiments, variant embodiments are not to be limited to any particular environment. The embodiments may be implemented, for example, in a hotel, boarding house, dormitory, apartment, or other commercial or residential establishment, where individuals are assigned to a unique extension or DID telephone number. The term "office" as used herein may encompass a singular room or space within a business, other enterprise, hotel room or similar facility. The term "user" as used herein may encompass an office employee, hotel guest or other individual associated with a telephone extension and DID telephone number, for example.

FIG. 1 illustrates a telecommunication system 10 constructed in accordance with at least one example embodiment. As will be discussed below, the system 10 provides for a full integration of remote telephony devices, such as a remote device 70 (shown in this example as a personal digital assistant (PDA) with wireless voice and data communications (also referred to herein more generally as a mobile device)), into an office, enterprise or hotel PBX or other communications network. The remote device 70 may be any suitable wirelessly enabled handheld remote device. The remote device 70 may be a dual mode (simultaneous data and voice communication capabilities) or single mode communication device, personal digital assistant, etc., such as the device 800 described in further detail below in relation to FIG. 8. In addition, the remote device 70 may be a cellular telephone, etc.

The system 10 can selectively establish communications with one of a plurality of devices associated with a particular telephone extension or DID telephone number. Moreover, the system 10 will allow remote devices 70 such as a mobile device (described below in more detail) to perform as a fully functional standard office telephone 12a, 12b for both inbound and outbound communications. That is, a remote device 70 will be able to use features of the office network (e.g., direct extension dialing, corporate dialing plan, enterprise voicemail etc.) even though the device is not within the confines of the office or not directly connected to the office PBX. The system 10 also allows the remote device 70 to operate as an independent PDA, wireless telephone, etc. if so desired. That is, the remote device 70 may receive calls placed to its (non-office) DID telephone number even though the system 10 also routes PBX calls to the remote device 70. In addition, the system 10 essentially implements all or part of call management functions typically available on office, enterprise or hotel PBX or other communications network desktop telephone. Some of these features are discussed in detail below.

The system 10 as particularly illustrated herein includes a conventional office PBX network 11, also referred to herein generally as an enterprise network. The PBX network 11 may include a plurality of standard telephones 12a, 12b respectively connected to a conventional PBX/IP-PBX 14 via communication lines 18a, 18b. Although PBX network 11 may use a PBX or IP-PBX 14, the following disclosure will simply refer to PBX 14 for convenience purposes. The PBX 14 is connected to a calling network such as a public switched telephone network (PSTN) 16 by a primary rate interface (PRI) connection 20 or other suitable communication line or medium. The standard telephones 12a, 12b can be any digital or analog telephone or other communication device known in the art. As illustrated in FIG. 1, the first telephone 12a is a digital telephone while the second telephone 12b is an analog telephone. For clarity purposes only, two telephones 12a, 12b are illustrated in FIG. 1, but it should be appreciated that any number or combination of telephones or other communication devices can be supported by the system 10. Moreover, although it is desirable to use digital telephones, embodiments described herein are not to be limited to the particular type of telephone used in the system 10.

The PBX 14 is coupled to a network server 30 (also generally referred to herein as "server 30"). The server 30 is connected to the PBX 14 in this embodiment by a PRI connection 22, VoIP connection 24 (if PBX 14 is an IP-PBX), or other suitable communication medium (e.g., WiFi connection). The server 30 is also connected to a PSTN 54 by a PRI connection or other suitable digital communication medium. The illustrated PRI connection between the server 30 and the PSTN 54 includes a first PRI connection 32, a channel service unit (CSU) 34, and a second PRI connection 36. As known in the art, a CSU is a mechanism for connecting a computer (or other device) to a digital medium that allows a customer to utilize their own equipment to retime and regenerate incoming signals. It should be appreciated that the illustrated connection between the server 30 and the PSTN 54 is one of many suitable connections, and that other types of connections may be implemented in variant embodiments. The server 30 is one of the mechanisms that allow the integration of remote devices (e.g., mobile device 70) into the PBX network 11 and its operation will be described below in more detail. Moreover, as will become apparent from the various call flow processes described in detail below, the server 30 maintains control over inbound, outgoing and in-progress calls and communications.

The server 30 is preferably connected to a local area network (LAN) 40 by an appropriate communication medium 38. Although a LAN 40 is illustrated, it should be appreciated that any other network could be used. A plurality of computers (e.g., 42a, 42b) may be respectively connected to the LAN 40 by any appropriate communication lines 44a, 44b. The computers 42a, 42b can be used by network administrators or others to maintain server 30 and other portions of the system 10. The LAN 40 may also be connected to the Internet 50 by a suitable communication medium 48. A firewall 46 may be used for security purposes. In accordance with an embodiment, Internet 50 can be used to allow a remote administration device 52 (e.g., a personal computer) to perform remote administration of server 30 by office personnel or other authorized users of the system 10. Remote administration will allow office personnel to set user preferences for particular telephone extensions. Thus, each office telephone extension and associated remote device is individually configurable.

PSTN 54 is connected in this embodiment to a commercial wireless carrier (or other carrier not co-located with the system 10) by a wireless switch 58 or other wireless carrier equipment by an appropriate communication medium 56. The wireless switch 58 is connected to at least one antenna 60 (by an appropriate communication medium 62) for transmitting signals 64 to a wireless remote device 70 operating outside of the enterprise network, but integrated with the enterprise network as described herein. The remote device 70 could be a pager, wireless telephone, cellular telephone, smart phone, or other wireless communication device, for example. It may be desirable for the remote device 70 to be capable of handling both (or either) digital and analog communication signals. It should be noted that any type of wireless communication protocol (or a combination of different protocols), such as TDMA, CDMA, GSM, AMPS, MSR, iDEN, WAP, WiFi, etc., could be used.

It should be appreciated that the server 30 is connected to a wireless carrier through a PSTN 54 and not by unique hardware or an in-office cellular network. As a result, server 30 only has to interface with conventional components, such as the PBX 14 and PSTN 54. Thus, the system 10 is substantially technology independent. Moreover, special wireless devices are not required, which allows the remote device to function in its conventional manner (e.g., as a separate mobile device) and as part of the PBX network 11 (if so desired).

The server 30 and the PBX 14 may also be connected to an accounting/billing system 80. The billing system 80 may also be connected to the LAN 40 so that system administrators may access the contents of the billing system 80. By incorporating a billing system 80 into the system 10, it is possible to obtain immediate billing information for calls placed to/from the remote device 70 or other remote device. This immediate billing feature is not present in other PBX or enterprise networks and is particularly useful for corporate environments such as law firms and government agencies, and hotel environments, where up to date billing information is essential.

The server 30 and/or the PBX 14 may also be connected to a call recording system 82. As will be described below, system 10 may be configured to facilitate encrypted voice communications between an external device (e.g. a mobile device) from which an incoming call originates or to which an outgoing call is placed, via PSTN 16 for example, and a telephony device (e.g. an office telephone 12a, 12b) connected to PBX 14 or a second external device (e.g. a remote device 70 such as a mobile device) served by server 30 as noted above. Voice communication data, either in encrypted form or decrypted form, that is processed by server 30 may be recorded and stored by call recording system 82 (e.g. within a database [not shown] managed by call recording system 82) for quality monitoring or to comply with regulatory requirements.

Figure 2:
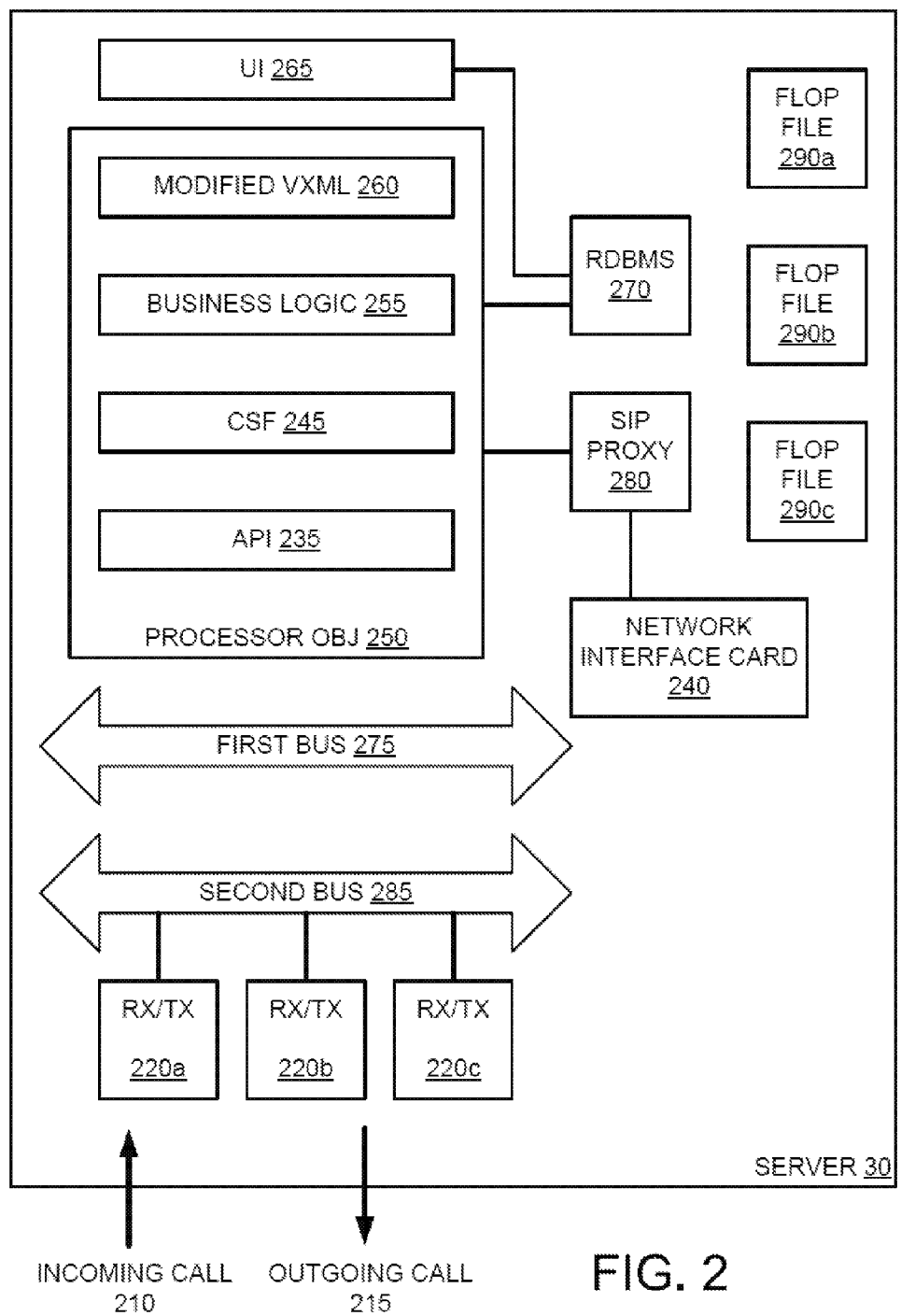
FIG. 2 illustrates an example of a server unit in accordance with at least one embodiment.

As noted above, the server 30 allows for the full integration of remote devices into the PBX network 11. In accordance with an embodiment, server 30 is a processor-based stand-alone unit capable of handling communications directed to the PBX network 11. In a first embodiment, shown in FIG. 2, server 30 comprises a plurality of receiving and transmitting modules 220a, 220b, 220c, first and second buses 275, 285, at least one processor module (Obj) 250, a network interface card 240 and a memory module operable to comprise a database 270 such as for example, a relational database management system (RDBMS). Further, server 30 can include a web-based user interface (UI) processor module 265, a Session Initiation Protocol (SIP) proxy server module 280 and a plurality of flop files 290a, 290b, 290c. The processor, UI and SIP proxy server modules 250, 265, 280 are processor cards (example hardware components of these cards are described below in more detail with reference to FIG. 4) containing source code, object modules, scripts, or other programming to perform the following functions.

The SIP proxy server module 280 receives session initiation protocol (SIP) messages from user agents and acts on their behalf in forwarding or responding to those messages. In essence, the SIP proxy server module 280 is a gateway for IP-based interfaces to the server 30. The SIP proxy server module 280 also adds services, features and scalability to SIP networks. The SIP proxy server module 280 typically includes a registration service and a SIP location database, in addition to the SIP proxy. Server 30 can receive an incoming call 210 and/or place an outgoing call 215 (described below in more detail). The processor module 250, among other things, directs and instructs the call processing of the server 30. The memory module comprising database 270 is used for storing user preferences and other pertinent information and may be a separate card or included within one of the other modules. The memory module may also be located external to the server 30, if desired, and connected to the server 30 by any wired or wireless communication medium.

Figure 4:
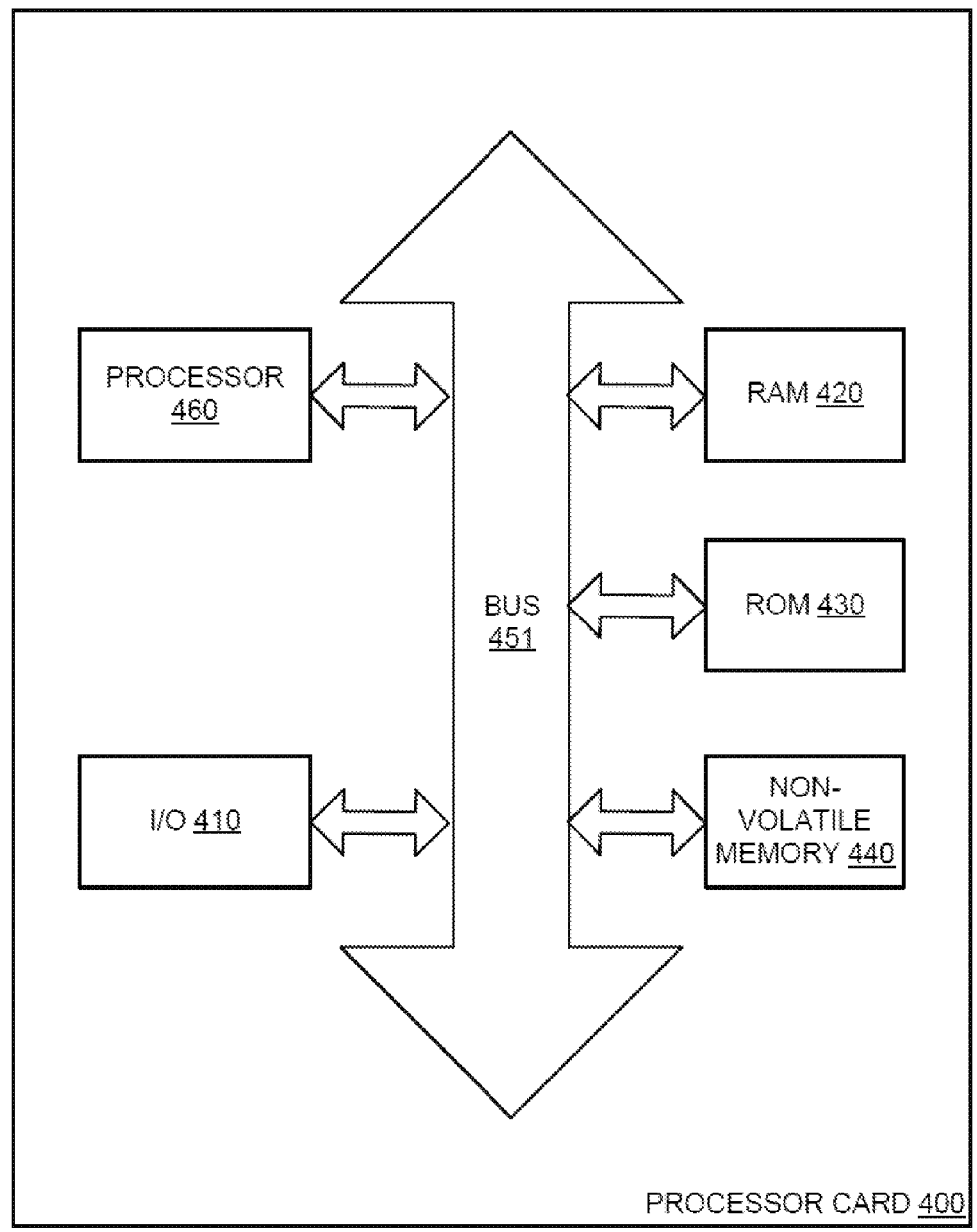
FIG. 4 illustrates an example of a processor module in accordance with at least one embodiment.

FIG. 4 illustrates an example processor card 400, which may be used for the processor, UI and SIP proxy server modules 250, 265, 280. The card 400 includes a processor 460 for executing the processes of processor module 250 (or the other modules) that communicates with various other devices of the card over a bus 451. These devices may include random access memory (RAM) 420, read-only memory (ROM) 430 and non-volatile memory 440. An input/output device (I/O) 410 provides communication into and out of the card 400. While one input/output device 410 is shown, there may be multiple I/O devices included on the card as desired. Source code, or other programming, comprising applications required by or performed in embodiments described herein may be stored on one of the computer readable storage media on the card 400 (e.g., ROM 430, non-volatile memory 440) and executed by the processor.

The processor module 250 executes one or more computer programs or applications (Obj) stored in one or more memory units within (e.g., as shown in FIG. 4) or coupled to the processor module 250. Processor module 250 can include one or more processes such as a modified VxML 260 call flow process, business logic process 255, call service function (CSF) process 245, and a global application processing interface (API) process 235. It should be appreciated that processor module 250 can include one, all, or any combination of the processes described. The processor module 250 may also contain one or more additional databases and/or other processing memory used during the overall operation of system 10.

In one embodiment, the business logic process 255 can be used for determining whether or not a calling party (incoming or outgoing) is a participant of the server 30 network and allows the server 30 to be flexibly configured by providing routing plans and route translations, IVR prompting and announcements, data manipulation, management and control. Business logic process 255 may also be configured to determine whether voice communications associated with a given incoming or outgoing call is to be secured, depending on whether the endpoints of the call lie within or outside of the network of devices connected to the PBX 14 (FIG. 1).

The UI module 265 includes processes that provide an easy, but powerful, user interface to administer, configure and manage applications including the management of system, user, conference, notification, IVR and voicemail applications, to name a few.

Figure 3:
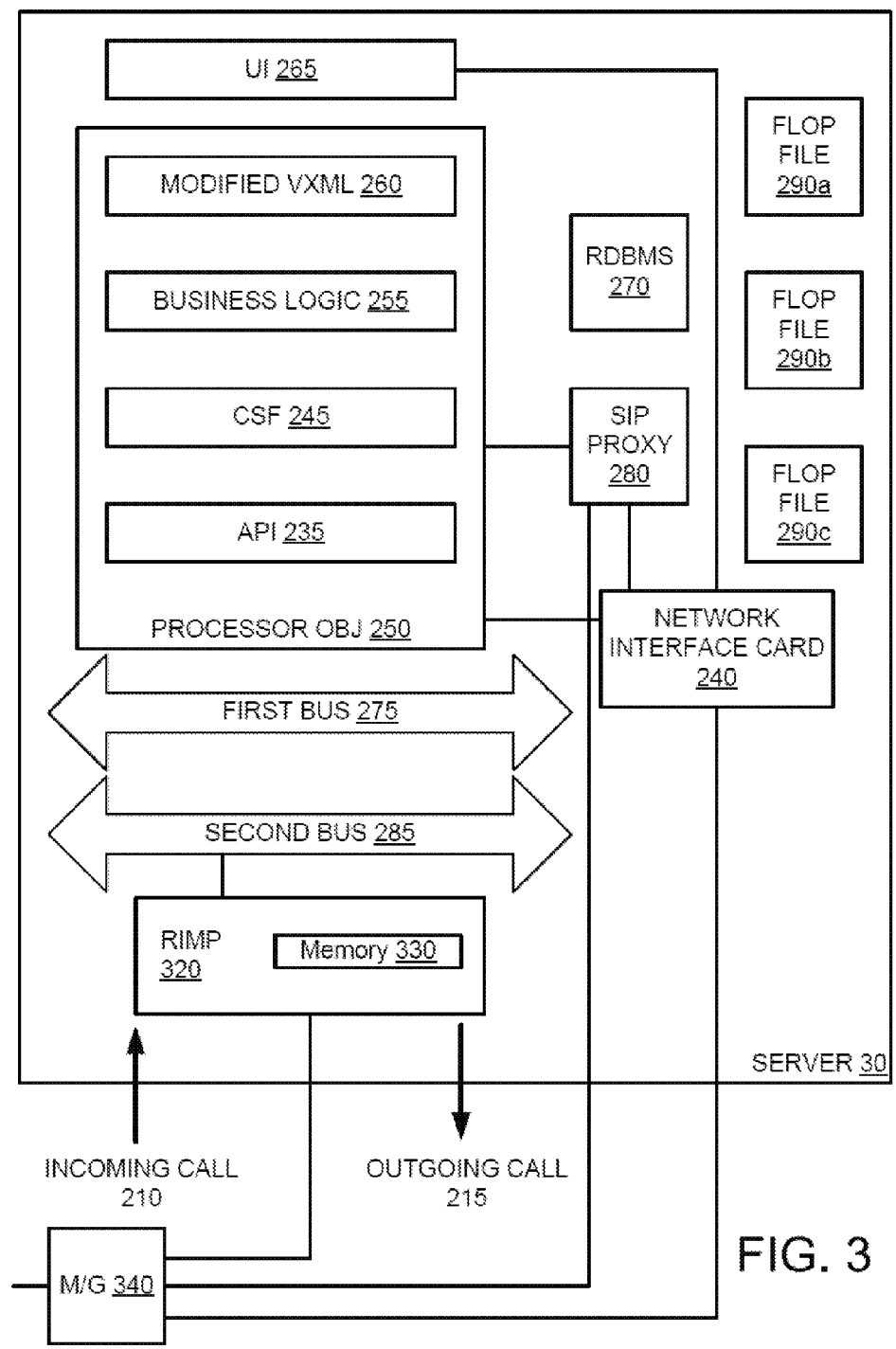
FIG. 3 illustrates another example of a server unit in accordance with at least one embodiment.

The plurality of receiving and transmitting modules 220a, 220b, 220c communicate with and handle incoming and outgoing telephone calls and are connected along bus 285. In one embodiment, bus 285 is an H100 or similar bus. The receiving and transmitting modules 220a, 220b, 220c may be telephonic cards such as e.g., Intel Dialogic cards, that communicate with processor module 250, database 270 and other components via bus 275 (for example, a PCI bus), which is bridged to bus 285 (bridge not shown), and are employed to receive and transmit information to the PBX 14 and PSTN 54 during call processing. The modules 220a, 220b, 220c also receive and transmit other information such as administrative information. In another embodiment, the receiving and transmitting modules 220a, 220b, 220c can also be implemented as a processor module 320 (RIMP) having a memory 330 comprising a program that, when executed, causes the processor 320 to perform the desired telephony functions, as shown in FIG. 3.

In one embodiment, the workload performed by the receiving and transmitting modules 220a, 220b, 220c, as well as some of the processing functions of processor module 250, are implemented using one or more conventional processor-based programmable telephony interface circuit cards (e.g., Intel Dialogic cards) used to interface server 30 with PBX 14 and the PSTN 54. The cards are programmed to perform the conventional telephony services required to place and receive calls, as well as being programmed to perform the call processing functions described below.

The server 30 preferably contains a database of office extension numbers (also referred to herein as PBX extensions) and DID telephone numbers associated with each existing PBX extension. The database will be stored on a computer readable storage medium, which may be part of (e.g., database 270) or connected to the server 30. The database may also contain a server-to-PBX extension (hereinafter referred to as a "SERVER-PBX extension") and one or more remote device telephone numbers associated with each PBX extension. In the illustrated embodiment, software running on the telephony modules 220a, 220b, 220c interfaces with the database to perform the various call processing functions discussed below.

In the embodiment illustrated in FIG. 1, the PBX 14 contains a coordinated dialing plan (CDP) steering table. The CDP steering table will be stored and retrieved from a computer readable storage medium, which may be part of or connected to the PBX 14. The CDP steering table directs the routing of some or all PBX extensions to the server 30 over the PRI 22 and VoIP 24 connections between the server 30 and the PBX 14. In addition, the CDP steering table of the PBX 14 directs the routing of all SERVER-PBX extensions received from the server 30 to the appropriate office telephone.

Figure 5A:
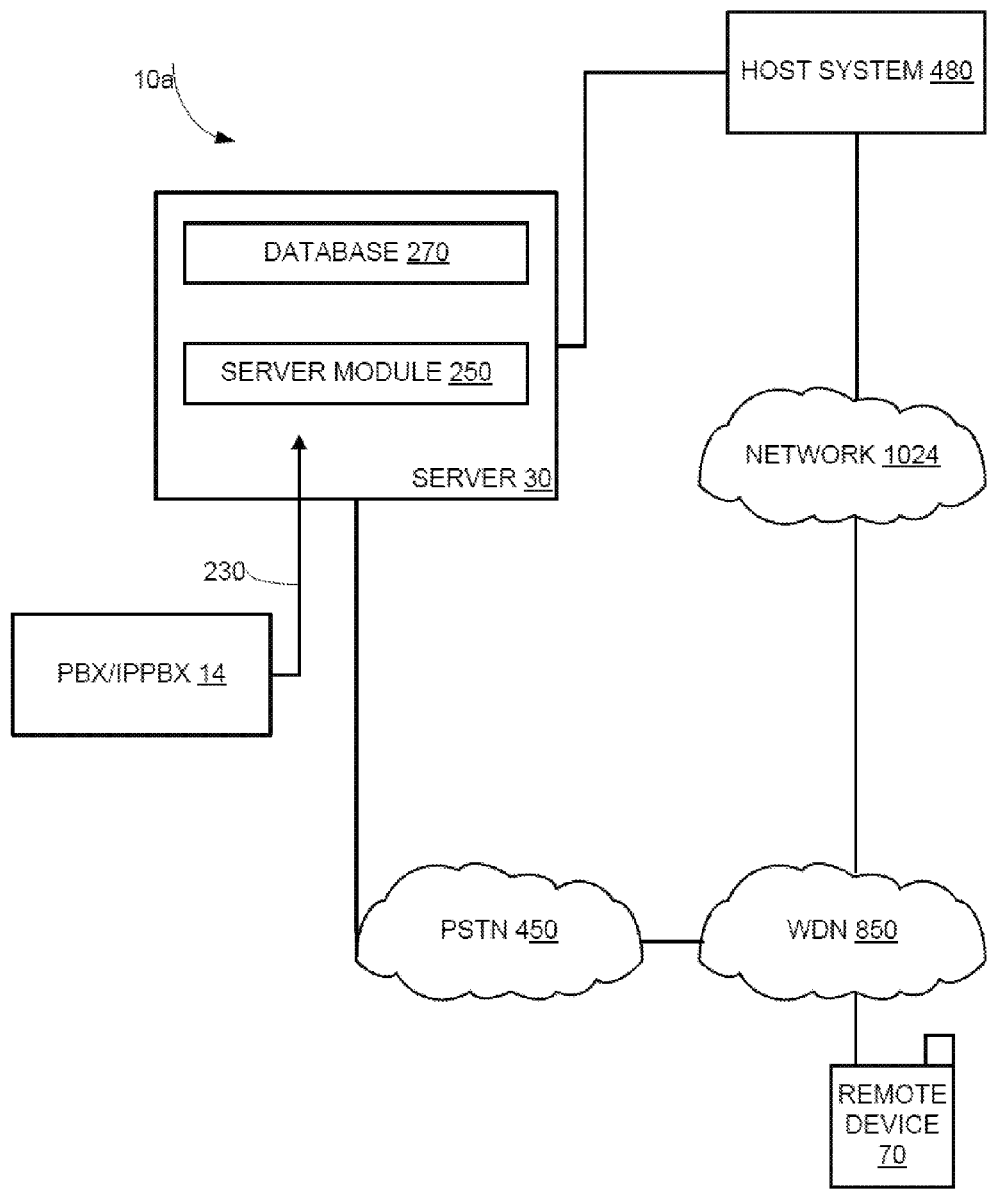
FIG. 5A illustrates another example of a telecommunication system constructed in accordance with at least one embodiment.

FIG. 5A illustrates another example of a telecommunication system 10a constructed in accordance with another embodiment. System 10a comprises PBX 14, which is connected to server 30, including processor module 250 and database 270, via a PRI connection 230. As stated above, PBX 14 could also be an IP-PBX and thus, there can also be a VoIP connection between the server and PBX 14. There can also be a wireless connection (e.g., WiFi) if desired. Server 30 also includes components from FIG. 2 or FIG. 3 as desired, but the components are not illustrated for convenience purposes. Server 30 is connected to remote device 70 via a host system 480, network 1024 and wireless network (WDN) 850 (all of which are described in more detail below with respect to FIGS. 10 and 11).

It should be appreciated that the data communications between the server 30, host system 480 and remote device 70 may be encrypted to render the information in the communications (i.e., telephone numbers, user login identifications, system information and settings, etc.) indecipherable to the public. Although the use of encryption is desirable, the decision of whether encryption is to be used may be left up to the end user or system administrator of the remote device 70, host system 480 and/or server 30. In particular, data communications may be encrypted in a secure data connection established between server 30 and remote device 70 (via components of host system 480). The established secure connection may be used to exchange encryption keys and other information needed to facilitate the subsequent encryption of voice communication data that may be transmitted to and from the remote device 70, as will be explained in greater detail later in this description.

Host system 480 can include a web services connection (i.e., for the Internet) to provide an interface between server 30 and remote device 70. The host system 480 can also include a mobile data server (e.g., server 1174 of FIG. 11) for facilitating data communications between server 30 and remote device 70 where the remote device 70 is a mobile device. A PSTN 450 is also in communication with server 30 and remote device 70.

Figure 5B:
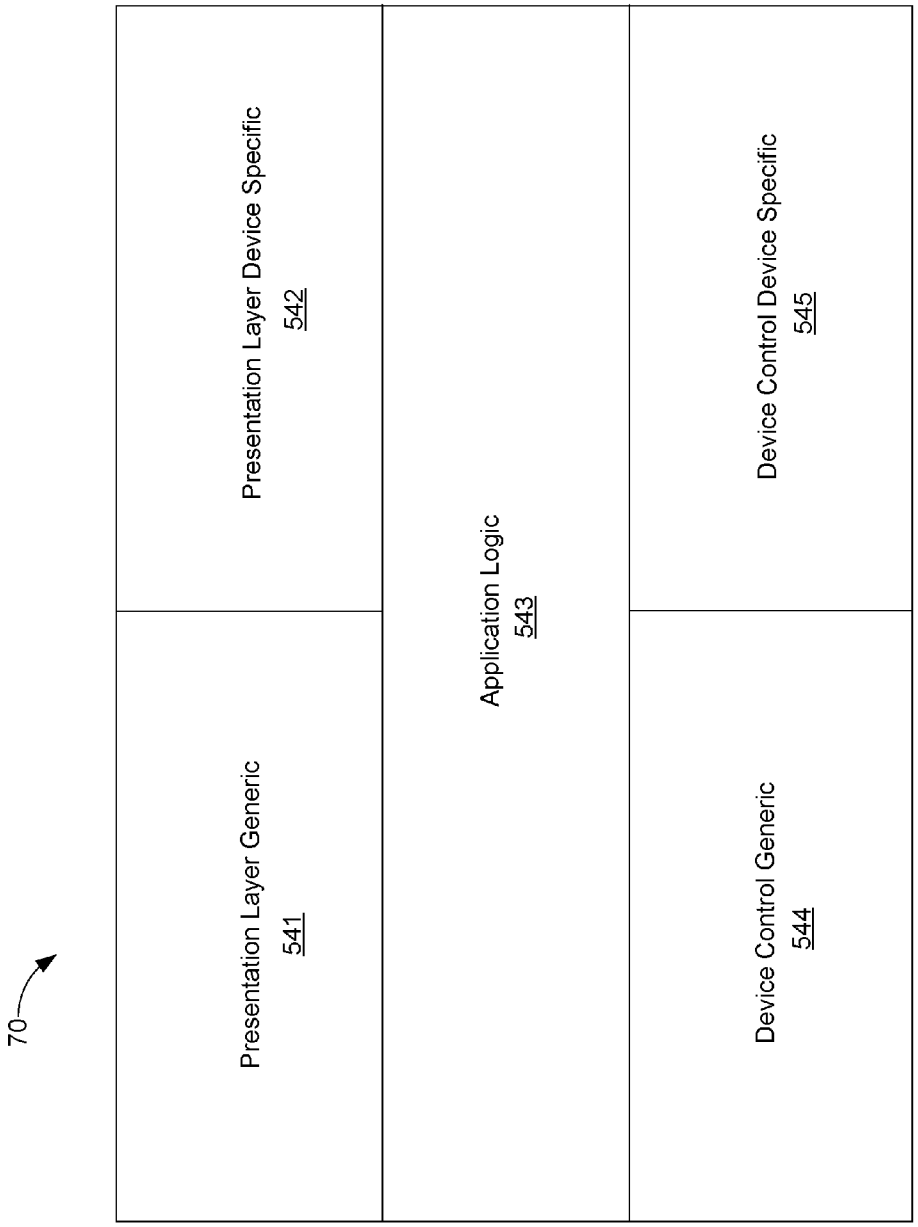
FIG. 5B illustrates an example mobile device architecture and applications of the device for use in the system of FIG. 5A.

Processor module 250 of server 30 executes one or more programs stored in its associated memory to process calls received through PBX 14 or PSTN 450. Remote device 70 and host system 480 will also contain a "client" application designed to communicate with the server 30 and perform the following processing in accordance with embodiments described herein. FIG. 5B illustrates an example architecture for remote device 70. The illustrated embodiment includes a generic presentation layer 541, device specific presentation layer 542, application logic 543, generic device control 544 and device specific device control 545. In general, the generic presentation layer 541 controls keypad and display functions. The device specific presentation layer 542 controls features specific to the remote device 70. For example, depending on the remote device 70, the features could include interfacing with a track wheel, track ball, or touch screen to name a few.

In the illustrated embodiment, the remote device 70 typically includes the following. The remote device 70 will have a screen with at least a reasonable resolution and basic graphical capabilities. The remote device 70 will also have at least a basic user input system comprising input devices such as e.g., function keys, reduced or full-size keyboard, and/or a graphical input capability (e.g., touch screen). The remote device 70 will further include a data communications interface for one or more of GPRS/EGPRS, 1XRTT/EVDO, 802.11A/B/G, WiMAX, for example, to name a few. The application running on the remote device 70 is designed as a generic application that has the capability to utilize the inherent interfaces of the remote device 70 (e.g., screen, input system and data communications).

The client application utilizes standard application programming interfaces (APIs) and built-in capabilities of the e.g., J2ME environment for the management of data presentation (layer 541) & device control (control 544). These standard capabilities allow for a level of generic data presentation, data input control and data messaging such as e.g., TCP/IP, UDP/IP, SMS, to name a few. In addition, each device manufacturer can also provide device specific APIs, controls and/or capabilities that allow for greater integration to the device (i.e., device specific presentation layer 542, device specific device control 545). These are typically included as libraries that can be built, linked or packaged with the client application. These device specific controls include, but are not limited to, such features as e.g., thumbwheel control, track ball control, phone book access and controls, security controls and extensions and proprietary or device specific message controls.

The application logic 543 manages the inputs and outputs to and from the remote device 70 and processes this information in a ubiquitous way to provide the generic device client capabilities such as e.g., administration, inbound call management, outbound call management and mid-call (or call in progress) management. The application logic 543 is written in a way to abstract this logic from the device specific interfaces so all the functionality will work across all the devices supported. As new/future devices become supported, the differences between the client applications are minimized.

Similar to system 10, system 10a essentially implements all or part of call management functions typically available on office, enterprise or hotel PBX or other communications network desktop telephones. Some of these features are discussed in detail below. Moreover, as will become apparent from the various call flow processes described in detail below, the server 30 maintains control over inbound, outgoing and in-progress calls and communications. In accordance with example embodiments, FIGS. 6A to 6H illustrate the basic call processing flows that the server 30 (via processor module 250), host system 480 and remote device 70 may be programmed to handle and execute.

Referring to FIG. 6A, as shown in scenarios 100 and 102, initially a remote device 70 attempts to log into server 30 by sending a session request login data signal to the server 30 (flow lines 100a, 102a). As is described in more detail below, the message from the remote device 70 is sent through system 480 by any of the various supported methods (e.g., web services). In response, the server 30 will either send a data signal to accept the login request (flow line 100b) (i.e., sends a session response accept data signal) or reject the login request (flow line 102b) (i.e., sends a session response reject data signal). If the remote device 70 is accepted by the server 30, the user has access to server 30 and the ability to process calls in any of the methods described below. It should be appreciated that the login request may be performed automatically (e.g., every time the remote device 70 is powered-up, or periodically), it may happen manually when the user selects a predetermined device application, or it may happen automatically or manually in response to a request from the server 30.

Figure 5C:
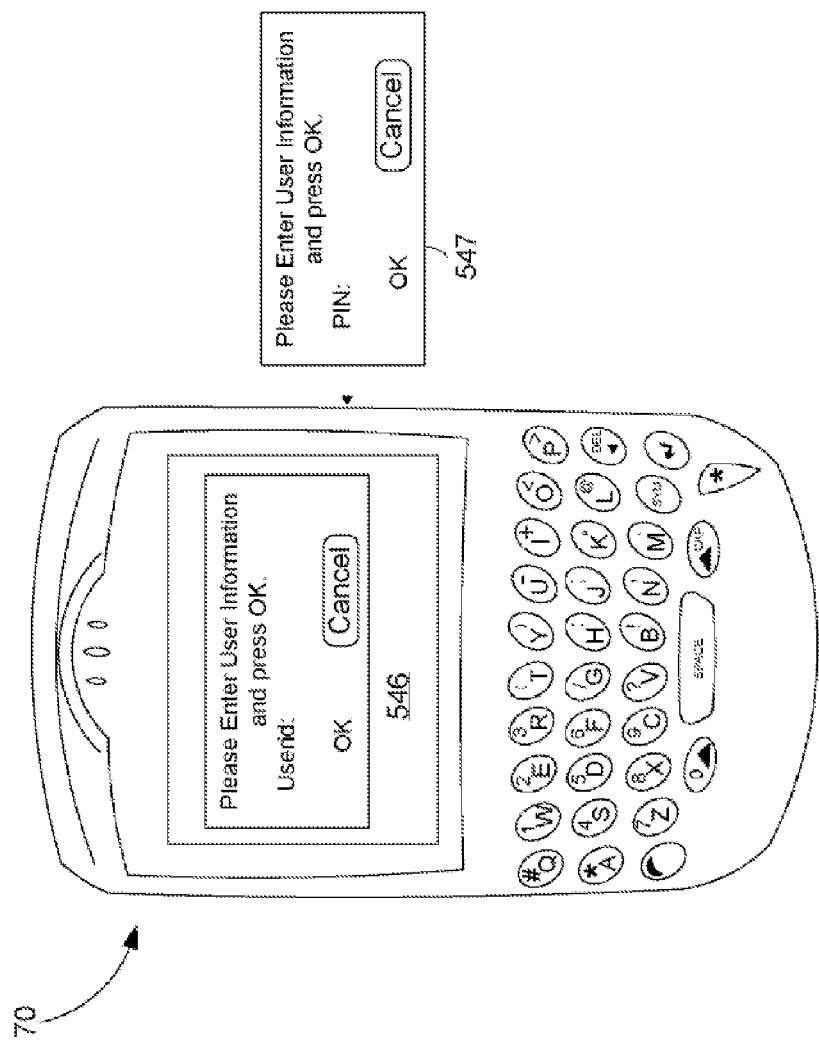
FIGS. 5C-5E illustrate examples of notification and user options displayable on the device of FIG. 5B.

FIG. 5C shows an example of a user interface on the remote device 70 allowing the user to perform the login process. As illustrated, the user may be prompted for a user identification (Userid) 546 and then a password or personal identification number (PIN) 547 associated with the Userid. A keypad and/or track wheel may be used to enter the required information. It should be appreciated that FIG. 5C is just one example of how the user may interface with the remote device 70 to initiate the login process.

At the end of a session or after a predetermined time period, as shown in scenario 103, the server 30 sends a session request logout data signal to the remote device 70 (flow line 103a). The remote device 70 responds with a session response accept data signal accepting the logout request from the server 30 (flow line 103b). It should be noted that the server 30 may be initially programmed to require the remote device 70 to login about every 24 hours. The user (via remote device 70 and as shown below) or a server administrator (via server 30) can change this timing, as well as other system features and settings.

Figure 6B:
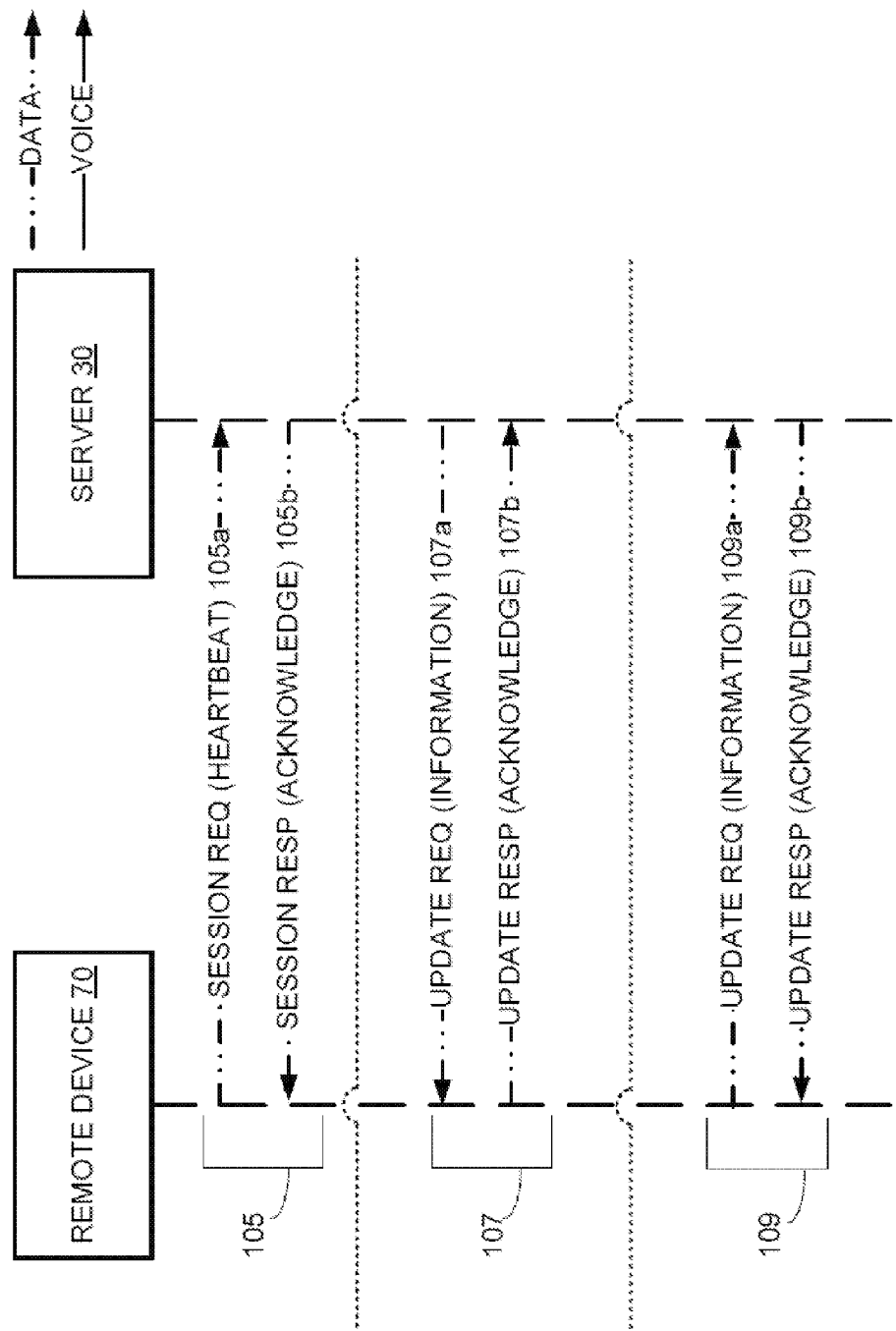

Remote device 70 and server 30 can periodically or continuously request information from each other using data signals as shown in FIG. 6B. In scenario 105, remote device 70 provides a session request heartbeat data signal to server 30 (flow line 105a) periodically or continuously (as set by default, user setting or system setting), which is acknowledged by server 30 in a session response acknowledge data signal (flow line 105b).

In scenario 107, the server 30 sends an informational update request data signal to remote device 70 (flow line 107a), which is acknowledged by the remote device 70 in an update response acknowledge data signal (flow line 107b). Update signals from server 30 can include profile information, system settings, messages, etc.

In scenario 109, the remote device 70 sends an informational update request data signal to server 30 (flow line 109a) that is acknowledged by the server 30 in an update response acknowledge data signal (flow line 109b). Update signals from the remote device 70 can include profile information, Do Not Disturb information (DND), user preferences, device configuration settings, etc.

Figure 5D:
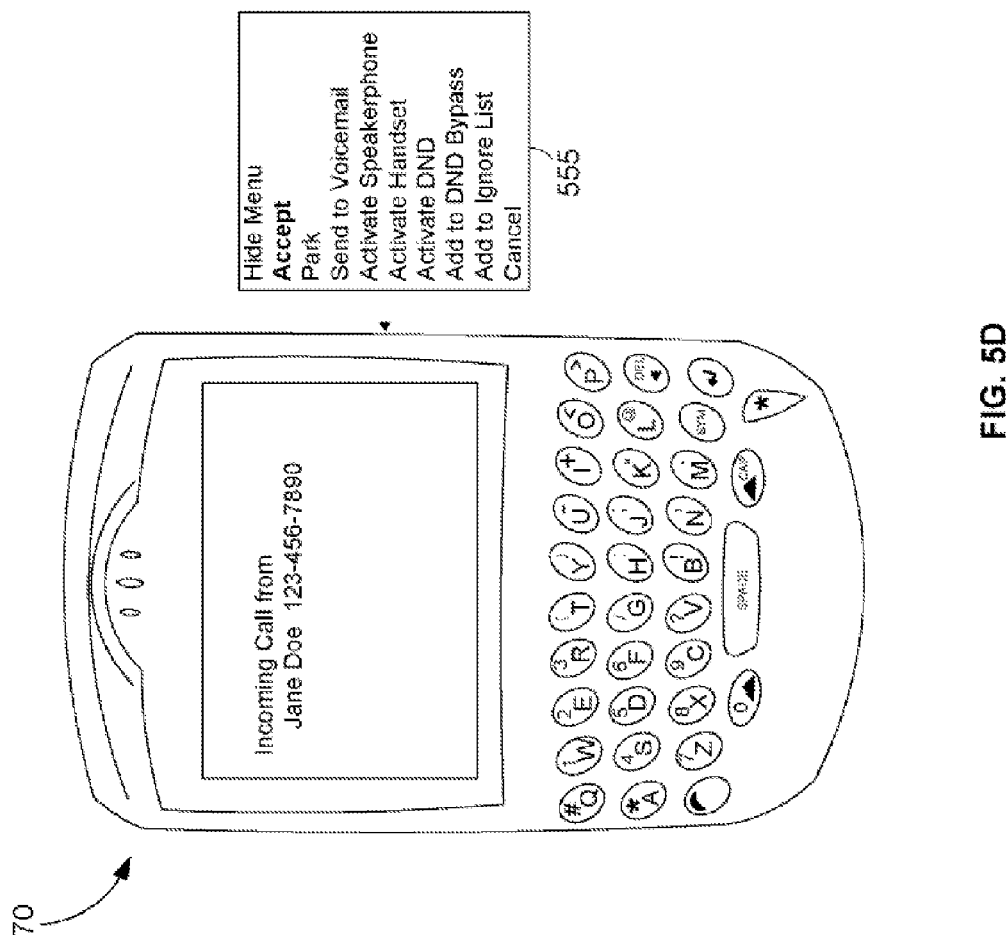

In scenario 104, as shown in FIG. 6C, a user can accept an incoming call placed to a PBX extension or DID telephone number by a caller (e.g., caller1). Server 30 receives an incoming voice call from the calling party (flow line 104a). Server 30 sends a call setup request data signal to the remote device 70 (flow line 104b) inquiring whether or not the user would like to accept the call. The call setup request data signal will cause an audible, visual and or vibrational indication to occur on the remote device 70 (as set by a user or system preference). For example, the call setup request data signal may cause the remote device 70 to play a ring, ring tone or other suitable audible indication. The call setup request data signal may cause the remote device 70 to display a textual or graphical message, pop-up or other visual notification (e.g., blinking LED on the device 70). FIG. 5D illustrates a textual message "Incoming Call from Jane Doe 123-456-7890" to alert the user of the caller. User responses may include, e.g., "answer" or "deflect". FIG. 5D illustrates options 555, which the user may select at this point. In scenario 104, the user chooses to answer the call by having the remote device 70 send a call setup response answer data signal to the server 30 (flow line 104c). This may be performed by selecting "accept" from the options 555 illustrated in FIG. 5D. In response, the server 30 will setup a voice call to the remote device 70 (voice signal flow line 104*d*) and substantially seamlessly connect the held calling party's incoming call to the remote device 70 via PSTN connection 450 (shown as voice signal flow line 104*e*). The user's acceptance or denial can be a manual input operation or automatic operation based on programmed user interfaces.

In scenario 106, the user of the remote device 70 wishes to deflect the inbound call to voicemail. In this scenario, server 30 receives an incoming voice call from the calling party (flow line 106*a*). Server 30 sends a call setup request data signal to the remote device 70 (flow line 106*b*) inquiring whether or not the user would like to accept the call. One or more of the above mentioned visual, audible and/or vibrational indications will be present at the remote device 70. The user chooses to deflect the call by having the remote device 70 send a call setup response deflect data signal to the server 30 (flow line 106*c*). This may be performed by selecting "send to voicemail" from the options 555 illustrated in FIG. 5D. In response, the server 30 will setup a voice call to e.g., the voicemail box associated with the user's PBX extension or other voicemail box setup by the user (voice signal flow line 106*d*). The server 30 connects the held calling party's incoming call to the voicemail box via PSTN connection 450 (shown as voice signal flow lines 106*e* and 106*f*). The calling party communicates via PSTN connection 450 with the user's voicemail via a connection path between the calling party and server 30 (flow line 106*e*), and another connection path between server 30 and the voicemail (flow line 106*f*).

Figure 5E:
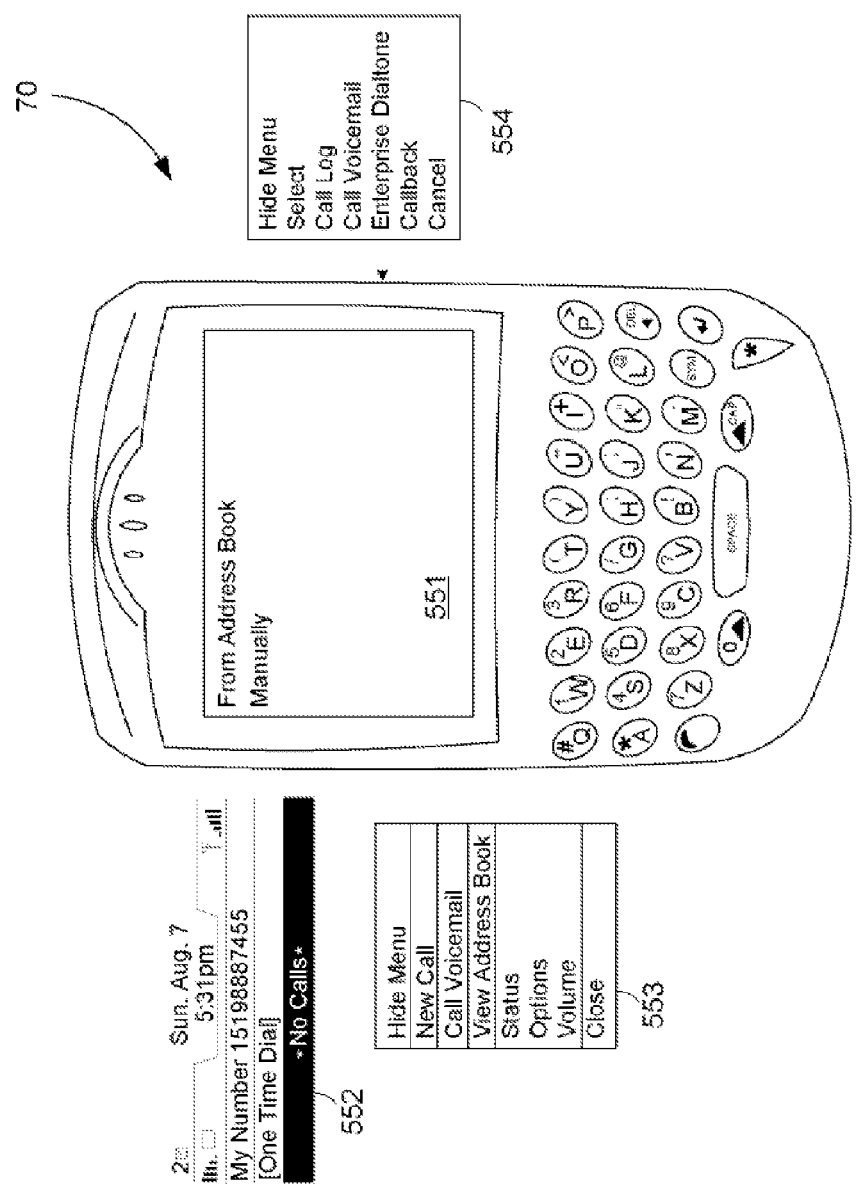

In FIG. 6D, scenarios 108 and 110 illustrate outgoing (from the remote device 70 through the server 30 and thus, the PBX) call scenarios. If a user wants to place a call to party 1, the user has the remote device 70 send an out dial request data signal (flow lines 108*a* and 110*a*) to server 30 requesting to place an outbound call through the server 30. FIG. 5E illustrates several user interfaces for the remote device 70 to accomplish this. For example, there may be options 551 for selecting the outbound number from an address book or entering the number manually. Menu option 553 illustrates a listing of call placement options as well. Option 552 shows a field for manual entry of the number to be dialed. Option 554 illustrates another menu or pop-up contains selections for the user to initiate the outbound call. It should be noted that any input mechanism (e.g., keyboard, track wheel, stylus, etc.) may be used to select the desired option.

Server 30 determines from the request whether the user and/or remote device 70 has sufficient rights to place the outbound call. Server 30 will respond by sending an out dial response accept data signal accepting the user's request (flow line 108*b*), or by sending an out dial response reject data signal (flow line 110*b*) rejecting the outbound call to remote device 70 depending on the user's rights. If the server 30 rejects the request (scenario 110), the out dial response reject data signal (flow line 110*b*) may include the reason for the rejection.

If server 30 accepts the outbound call request (scenario 108), the server 30 will place an outbound voice call (flow line 108*c*) to the remote device 70 and another voice call (flow line 108*d*) to the called party (e.g., party 1). The server 30 then substantially seamlessly connects the two calls allowing voice communications (two-way voice communication signal flow line 108*e*) between the called party and user of the remote device 70.

As can be seen, both inbound and outbound call processing do not utilize voice communications between the remote device 70 and server 30 until it is determined that the user of the remote device 70 wishes to receive the call (inbound) or has access rights to place the call (outbound). This saves costs by not using the PSTN connections until absolutely necessary. Moreover, the use of data signals provides the remote device 70 with additional information and control over the call.

Scenarios 112 to 130, as illustrated in FIGS. 6E to 6H, relate to call processing while a call/connection is already in progress. Referring to FIG. 6E, in scenario 112, during a voice communication between remote device 70 and party 1 through server 30 (communication flow line 112*a*), server 30 receives a second voice call communication (flow line 112*b*) from party 2 destined for the user of remote device 70. Server 30 sends a call setup request data signal (flow line 112*c*) to the remote device 70 alerting the remote device 70 to the new call. The call setup request data signal will cause an audible, visual and or vibrational indication to occur on the remote device 70 (as set by a user or system preference and as described above in more detail). In scenario 112, the remote device 70 user has chosen to deflect the second call by sending, to server 30, a call setup response data signal (flow line 112*d*) deflecting the call to a destination contained in the data signal. This may be performed by selecting e.g., "send to voicemail" from the options 555 illustrated in FIG. 5D. The established voice communications between the remote device 70 and party 1 remain (communication flow line 112*e*), but the server deflects the second call to the identified destination (shown in FIG. 6E as e.g., a IVR, voicemail, extension or other number) via another voice communication (flow line 112*f*).

In scenario 114, during a voice communication between remote device 70 and party 1 through server 30 (communication flow line 114*a*), server 30 receives a second voice call communication (flow line 114*b*) from party 2 destined for the user of remote device 70. Server 30 sends a call setup request data signal (flow line 114*c*) to the remote device 70 alerting the remote device 70 to the new call. One or more of the above mentioned visual, audible and/or vibrational indications will be present at the remote device 70. In this scenario, the user has chosen to accept the second call by sending a call setup response accept and hold data signal (flow line 114*d*) to the server 30. This may be performed by selecting "accept" from the options 555 illustrated in FIG. 5D. The server 30 will place the first voice call on hold (flow line 114*e*) and/or deflect the first call to the user's voicemail or destination (flow line 114*f*). Server 30 will establish and connect a voice communication (flow line 114*g*) with the remote device 70 and a voice communication (flow line 114*h*) with party 2.

In scenario 116, communication flow lines 116*a*-116*c* are similar to communication flow lines 114*a*-114*c* described above. In scenario 116, however, the user has decided to accept and conference in the second call by sending a call setup response accept and conference data signal (flow line 116*d*) to the server 30. This may be performed by selecting an option presented on the remote device 70 or by pressing a key or combination of keys on the remote device 70. The server 30 maintains the voice communication (flow line 116*e*) of the in progress call and connects it to a voice communication (flow line 116*f*) between the second calling party (party 2) and server 30, which connects party 1, party 2 and the user of the remote device 70.

According to variant embodiments, during other "call in progress" scenarios, a user of the remote device 70 can place outbound calls as shown in scenarios 118 and 120 (illustrated in FIG. 6F). In both scenarios, party 1 and a user of remote device 70 have a voice call in progress (flow lines 118*a* and 120*a*) via server 30. In scenario 118, the user of remote device 70 begins to place a second call by sending an out dial request hold data signal (flow line 118*b*) to server 30. This may be performed by selecting an option presented on the remote device 70 or by pressing a key or combination of keys on the remote device 70. Server 30 will respond using an out dial response accept data signal (flow line 118*c*). The server 30 places the first call on hold (voice communication flow line 118*d*) and/or deflects the first call to the user's voicemail or other destination (voice communication flow line 118*e*). Server 30 will then place a second voice call/communication (flow line 118*f*) to party 2 and a third voice call/communication (flow line 118*g*) to remote device 70. Server 30 then seamlessly connects remote device 70 to the second called party) communication flow lines 118*h* and 118*i*).

In scenario 120, the user of remote device 70 desires to place a second call and conference in party 2. To do so, the user of remote device 70 sends an out dial request conference data signal (flow line 120*b*) to server 30. This may be performed by selecting an option presented on the remote device 70 or by pressing a key or combination of keys on the remote device 70. Server 30 responds using an out dial response request data signal (flow line 120*c*). Server 30 then places a second voice call/communication (flow line 120*e*) to party 2, while maintaining the initial voice call connection (flow line 120*d*). Server 30 will seamlessly connect the initial voice communication to the second voice communication (see communications flow lines 120*f* and 120*g*). It should be appreciated that scenarios 118, 120 and 121 are preferably implemented using dual-mode remote devices 70 or a dual-mode interface in order to properly handle voice and data communications during the same scenarios.

Additionally, as shown in scenario 121, during a voice communication 121*a* already in progress, remote device 70 can send a disconnect request and follow on call (FOC) data signal (flow line 121*b*) to server 30 requesting to disconnect the current voice communication and place a follow on call. This may be performed by selecting an option presented on the remote device 70 or by pressing a key or combination of keys on the remote device 70. The server 30 acknowledges this request with a disconnect response data signal (flow line 121*c*). Server 30 will disconnect party 1, maintain a voice communication (flow line 121*d*) with the remote device 70, and place an outgoing voice communication call (flow line 121*e*) to party 2. Server 30 then will connect the two voice communications to form voice conversation between the remote device 70 and party 2 (via communication flow lines 121*f* and 121*g*).

During similar call-in progress scenarios, a user can receive inbound calls and place outbound calls using DTMF coding via the PSTN connection as shown in scenarios 122-130 illustrated in FIGS. 6G and 6H. Each scenario respectively begins with a voice communication flow 122*a*, 124*a*, 126*a*, 128*a*, 130*a* (via server 30) between party 1 and a user of remote device 70.

Referring to FIG. 6G, in scenario 122, a second voice communication (flow line 122*b*) is received by server 30. Server 30 sends a barge-in tone signal (flow line 122*c*) via DTMF coding to remote device 70 while the original voice conversation (flow line 122*d*) continues. In a desired embodiment, the server 30 filters the signal in a manner such that only the recipient of the remote device 70 hears the tone. This way, party 1 (or party 2) does not hear the tone. The user of the remote device 70 responds using an accept DTMF tone signal (flow line 122*e*). This may be performed by selecting an option presented on the remote device 70 or by pressing a key or combination of keys on the remote device 70. Again, in a desired embodiment, this signal is also filtered by the server 30 to ensure that party 1 (or party 2) does not hear the tone.

The original conversation is placed on hold (communication flow line 122*f*) and/or deflected to e.g., voicemail (communication flow line 122*g*). Server 30 will seamlessly connect remote device 70 to party 2 (voice communication flow lines 122*h* and 122*i*).

The user of the remote device 70 can, alternatively, deflect the second call to his/her voicemail or another number associated to the user's extension, as shown in scenario 124. Communication flow lines 124*a*-124*d* are similar to communication flow lines 122*a*-122*d* described above. In this scenario, the user of the remote device 70 responds using a deflect DTMF tone signal (flow line 124*e*) (e.g., by selecting an option on the device 70, or by pressing a predefined key or key combination) to deflect the second call to his/her voicemail, etc. (voice communication flow line 124*g*) while the original conversation (communication flow line 124*f*) continues.

In scenario 126, the remote device 70 user decides to conference-in party 2. Communication flow lines 126*a*-126*d* are similar to communication flow lines 122*a*-122*d* described above. In this scenario, however, the user of the remote device 70 responds using a conference DTMF tone signal (flow line 126*e*) (e.g., by selecting an option on the remote device 70, or by pressing a predefined key or key combination) to alert the server that party 2 should be conferenced-in. Server 30 will then seamlessly connect the initial conversation (voice communication flow line 126*f*) and party 2 (voice communication flow line 126*g*).

Referring to FIG. 6H, in scenario 128, during an ongoing voice communication (flow line 128*a*), the user of the remote device 70 decides to send a hold DTMF tone signal (flow line 128*b*) to server 30 requesting the server 30 to place the current call on hold and to place an outbound call. This may be performed by any of the mechanisms described above. In response, server 30 will place the original communication (flow line 128*c*) on hold and/or deflect the original call to another number e.g., user's voicemail (communication flow line 128*d*), and place an outbound voice communication (flow line 128*e*) to party 2. Server 30 also forms a voice connection (flow line 128*f*) to the remote device 70, and then seamlessly connects party 2 to the remote device 70 (communication flow lines 128*g* and 128*h*).

In scenario 130, the user of the remote device 70 can conference in party 2 (i.e., add a third party) to an existing voice communication (flow line 130*a*). To do so, the user of the remote device 70 sends a conference DTMF tone signal (flow line 130*b*) to server 30 while the existing communication (flow line 130*c*) continues. This may be performed by any of the mechanisms described above. Server 30 then places a second voice call (flow line 130*d*) to party 2 and seamlessly connects this call to the existing conversation (communication flow lines 130*e* and 130*f*) creating a conference.

One more call in progress scenario allows the user to disconnect the current call and place a follow on call as shown in scenario 131. That is, with a voice communication in progress (flow line 131*a*), the remote device 70 sends a disconnect, follow on call DTMF tone signal (flow line 131*b*) to the server 30. This may be performed by any of the mechanisms described above. Server 30 allows remote device 70 to maintain a voice communication connection (flow line 131*c*) with the server 30 and then places an outgoing voice communication (flow line 131*d*) to party 2. Server 30 will then connect remote device 70 to party 2 (communication flow lines 131*e* and 131*f*).

It should be appreciated that the interaction between remote device 70 and server 30 can include any call processing telephony functions such as simultaneous ring across multiple devices, single voicemail box, universal voice mail notification, answer acknowledgement, making and receiving a call, abbreviating extension dialing, call hold and retrieval, multiple call appearance, direct inward/outward dialing, post digit dialing, flexible dialing plans/international dialing, caller ID (name, number), voicemail notification, auto reconnect, callback, call forwarding, call transfer, call hold, call waiting, call mute, call blocking, call redial, call parking, speed dial, operator assisted dialing, Do Not Disturb (DND), DND Bypass List (i.e., a list of name/numbers allowed to bypass the do not disturb feature), and DND Ignore List (i.e., a list of names/numbers to always divert to voicemail).

It will be understood by persons skilled in the art that the above scenarios for handling incoming calls from a "Caller 1" as described with reference to FIGS. 6C to 6H does not make any assumptions about the nature of the voice communications between the device of the calling party and the remote device 70, as managed by server 30. In particular, the above examples do not require that the voice communication data be encrypted. However, as the demand for and usage of mobile devices increase, a system configured to facilitate more secure voice communications may be desirable.

Figure 6I:
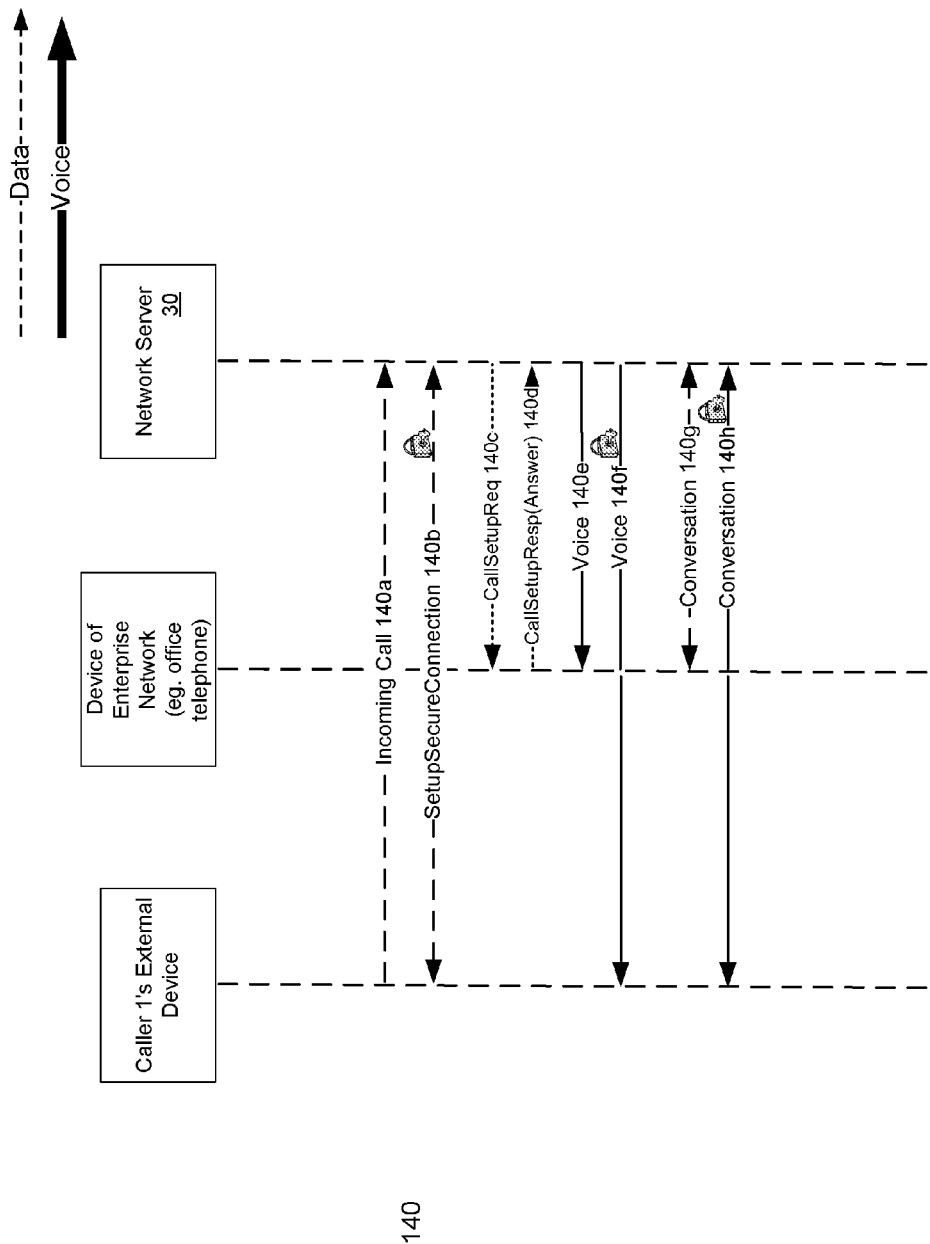

Referring now to FIG. 6I, a line flow diagram illustrating various operations performed by other example embodiments is shown. In scenario 140, the user can accept an incoming call placed to a PBX extension or DID telephone number by a caller (e.g. caller 1) at an office telephone (e.g. digital telephone 12a of FIG. 1), for example. Server 30 receives the incoming call from the device (flow line 140a), via PSTN 16 (FIG. 1) for example.

If the call need not be forwarded to the intended recipient user at a remote device 70 as in this example, voice communication data transmitted between server 30 and the telephony device within the enterprise network (e.g. an office telephone 12a, 12b) may be left unencrypted when the telephony devices at which the call might be received are all considered to operate within a secure domain. For example, if all voice communications are transmitted between server 30 and an office telephone 12a via one or more private networks or connections only, and not via a public network or other shared network infrastructure such as the Internet or a PSTN, then there may be less need to secure the transmitted voice communication data.

It will be understood that other devices may also be considered to operate within a secure domain, and may be used to facilitate voice and data communications even if they may not be strictly considered to be telephony devices in a traditional sense. These may include computing devices equipped with instant messaging clients, for example.

Referring again to the example of FIG. 6I, the incoming voice call from Caller 1 originates from an external device such as a mobile device (not explicitly shown in previous Figures), which may be a device that is similar to a remote device 70 (described above with reference to the previous Figures) to which server 30 may route the call, where the remote device 70 is a mobile device 800 as described with reference to FIGS. 8 to 11 for example. The external device from which the voice call originates comprises a client application configured to enable voice communications with a network server to be secured as described below.

As the call originates from an external device such as a mobile device, it may be desirable to ensure that voice communication data is secured at least between the calling party's external device and the server 30, even where the call may be answered by a receiving party using a telephony device connected directly to PBX 14 within an enterprise network.

When placing the call that is received at server 30, caller 1 may operate his external device to indicate that the call, if answered, should proceed such that the voice communications will be secure. Caller 1's external device can be configured so that a menu option is provided that allows him to request that a secure call be made, if so desired. Alternatively, caller 1's external device may be configured by an administrator (e.g. through IT Policy) such that all subsequent calls made from caller 1's external device are to be secured automatically. As a further example, caller 1's external device may be configured by a user and/or an administrator such that all calls subsequently made to one or more designated phone numbers and/or to one or more designated contacts are to be automatically secured. Other configurations may similarly require calls received at caller 1's external device to be secured. It will be understood that other configurations in variant embodiments are possible.

In this example, when caller 1 places the call (flow line 140a), a data signal is transmitted from caller 1's external device to server 30, which indicates that the voice communication data for the call, if answered, is to be secured.

Server 30 then transmits a data signal back to caller 1's external device in response that provides the necessary information required to secure subsequent voice communications. For example, an encryption key for use in encrypting and decrypting voice communication data to be sent from and received by caller 1's external device respectively may be transmitted by network server 30 to caller 1's external device (flow line 140b). Other parameters (e.g. data identifying the encryption algorithm to be used) may also be transmitted by network server 30 to caller 1's external device. Depending on the particular implementation, one or more data exchanges may be required to facilitate the setup of the secure connection. However, in any event, these data transmissions and exchanges are transparent to caller 1.

The encryption key transmitted by network server 30 to caller 1's external device for use in encrypting and decrypting voice communications may take various forms, depending on the particular implementation. In particular, standard and non-standard encryption or codec obfuscation algorithms may be employed that utilize an "encryption key".

For example, the "encryption key" may be used to more generally refer to an encoding parameter. For instance, a known bit-shifting, bit swapping, substitution and/or other encoding algorithm may be employed, where the "encryption key" is a parameter associated with the particular encoding algorithm.

In at least one example embodiment, the encryption key transmitted by server 30 to caller 1's external device is a symmetric session key that is to be used for the particular call being set up (e.g. different session keys are associated with different calls). Voice communication data can subsequently be encrypted using the session key and an appropriate symmetric encryption algorithm (e.g. Triple DES), by server 30 and caller 1's external device. However, prior to use, the session key to be used for subsequent voice communications must be shared, and if exchanged, it must be securely exchanged to avoid unauthorized use by third parties.

Figure 11:
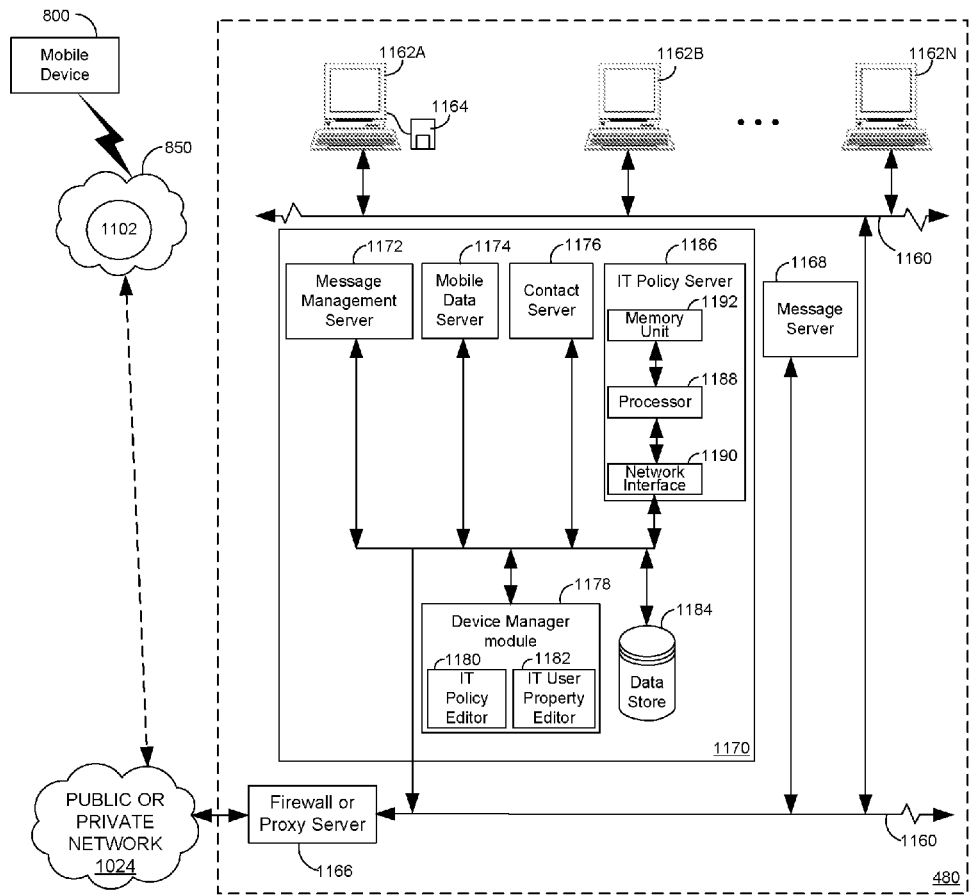
FIG. 11 is a block diagram illustrating components of a host system in one example configuration for use with the wireless network of FIG. 10 and the mobile device of FIG. 8.

In one embodiment, server 30 is pre-configured to securely communicate with a wireless communication support component such as a message management server, a mobile data server, or other intermediate server also coupled to caller 1's external device (see e.g. wireless communication support components 1170 of FIG. 11). This may be the case, for example, if caller 1 and the party he is calling belong to the same organization or are otherwise served by the same network or host system 480. If the data communication channel between the wireless communication support component and caller 1's external device has already been secured for other data communications, then server 30 may transmit the session key to caller 1's external device via the wireless communication support component.

Public key encryption may also be used to exchange session keys, or to encode voice communication data directly in variant embodiments. Public key encryption algorithms are known. Generally, data encoded using a private key of a private key/public key pair can only be decoded using the corresponding public key of the pair, and data encoded using a public key of a private key/public key pair can only be decoded using the corresponding private key of the pair.

For example, in one variant embodiment, server 30 may have access to a public key associated with caller 1 or his external device. The requisite public key may have been obtained by server 30 from an LDAP server, or possibly from caller 1's external device with the data received with the incoming call data (flow line 140*a*). In known manner, the session key may be encrypted with caller 1's public key at server 30, and transmitted to caller 1's external device, where it can be decrypted at caller 1's external device with a corresponding private key that should only be available at that external device. Subsequent voice communication data may be encrypted at caller 1's external device with the received session key after it is decrypted. In this embodiment where public key cryptography is employed to securely exchange the session key, a secure path between server 30 and caller 1's external device need not be pre-established in order for the session key to be exchanged.

In another variant embodiment, server 30 may have access to a public key associated with caller 1 or his external device, and may simply provide caller 1's external device with its own (i.e. a server's) public key to be used to secure subsequent voice communications. The corresponding private key associated with the server's public key is intended to only be accessible by server 30. Subsequent voice communications to be transmitted to server 30 may be encrypted at caller 1's external device with the server's public key. Conversely, voice communications received at caller 1's external device will have been encrypted by server 30 with caller 1's public key, and will be decrypted at caller 1's external device with caller 1's corresponding private key. In this embodiment where the public keys of both devices are used to directly encrypt voice communication data, a secure path between server 30 and caller 1's external device need not be established, and a session key need not be exchanged.

In a variant embodiment, the encryption key to be used to encrypt voice communication data may be pre-stored on caller 1's external device. For example, it may be installed on the external device at the time of manufacture, or subsequently downloaded to the external device from a desktop computer via a physical connection (e.g. during a synchronization process). Other secure methods of pre-exchanging the requisite encryption key may be employed, and the "encryption key" transmitted to caller 1's external device from network server 30 at flow line 140*b* may simply comprise an appropriate key identifier that indicates the pre-stored or pre-exchanged encryption key at the external device to be used in securing subsequent voice communications.

It will be understood by persons skilled in the art that the key exchange shown at flow line 140*b* need not be performed immediately after the data associated with the incoming call is received by server 30 (flow line 140*a*). For example, in one embodiment, the key exchange may take place only after the call is actually "answered" or accepted by the party being called (or where a voicemail message is to be left). In this manner, the encryption key need not be exchanged unnecessarily where no voice communications to or from the external device are to take place.

However, exchanging encryption keys (e.g. a session key) at an earlier stage may minimize delays in setting up the secure connection between caller 1's external device and network server 30, from the perspective of the parties associated with the call, particularly caller 1. In one embodiment, the key exchange depicted by flow line 140*b* may be performed contemporaneously with at least some of the steps taken to setup the call at the receiving party's endpoint, as described below. This may speed up the connection process, enhancing the user experience.

Referring again to FIG. 6I, server 30 sends a call setup request data signal to the office telephone (flow line 140*c*). The call setup request data signal will cause an audible and/or visual indication on the office telephone (i.e. "ringing"). If the party receiving the call answers the office telephone, the call is deemed to be accepted and a call setup response answer data signal is returned to server 30 (flow line 140*d*). In response, the server 30 will setup a voice call to the office telephone (voice signal flow line 140*e*) as well as to caller 1's external device (voice signal flow line 140*f*). Server 30 encrypts the data transmitted to caller 1's external device, for example, with the previously exchanged or identified session key (flow line 140*b*).

From the perspective of the parties involved in the subsequent conversation, it will appear that the server 30 will then substantially seamlessly connect the incoming call to the office telephone. In controlling the subsequent conversation, voice communication data originating from caller 1's external device (flow line 140*h*) will be in encrypted form (e.g. having been encrypted with a session key exchanged at flow line 140*b*) when received at server 30. The server 30 decrypts the voice communication data, and relays the voice communication data in decrypted form to the office telephone.

On the other hand, voice communication data originating from the office telephone will be in decrypted form when received at server 30. The server 30 will encrypt the voice communication data with the requisite session key before transmitting the voice communication data to caller 1's external device.

In at least one embodiment, server 30 sets up the call between caller 1's external device and the office telephone such that the encrypted voice communication data associated with the call is transmitted over standard cellular networks. Caller 1's external device and server 30 may be configured to determine the best means on how to establish an encrypted call, whether as a standard cellular call (if an end-to-end call can be established without voice compression), or as a cellular modem call, for example. The latter may be preferable to guarantee end-to-end connectivity without compression. On certain 3G networks, a data call may be established if permitted by the carrier.

Referring now to FIG. 6J, a line flow diagram illustrating various operations performed by other example embodiments is shown. In scenario 150, the user can accept an incoming call placed to a PBX extension or DID telephone number by a caller (e.g. caller 1) at a remote device 70, similar to situation 104 described earlier with reference to FIG. 6C. In this example, the incoming call originates from an external device, such as a mobile device. The external device from which the call originates comprises a client application configured to enable voice communications with a network server to be secured as described below. Server 30 receives the incoming call from the external device (flow line 140*a*), via PSTN 16 (FIG. 1) for example.

As the call may be forwarded to the intended recipient user at a remote device 70 in this example, voice communication data transmitted between the remote device 70 within the enterprise network would also need to be encrypted to maintain security throughout the call.

As described above with reference to FIG. 6I, when placing the call that is received at server 30, caller 1 may operate his external device to indicate that the call, if answered, should proceed such that subsequent voice communications will be secure. Caller 1's external device can be configured so that a menu option is provided that allows him to request that a secure call be made, if so desired. Alternatively, caller 1's external device may be configured by an administrator (e.g. through IT Policy) such that all subsequent calls made from caller 1's external device are to be secured automatically. As a further example, caller 1's external device may be configured by a user and/or an administrator such that all calls subsequently made to one or more designated phone numbers and/or to one or more designated contacts are to be automatically secured. Other configurations may similarly require calls received at caller 1's external device to be secured. It will be understood that other configurations in variant embodiments are possible.

In this example, when caller 1 places the call (flow line 150*a*), a data signal is transmitted from caller 1's external device to server 30, which indicates that the voice communication data for the call, if answered, is to be secured.

Server 30 then transmits a data signal back to caller 1's external device in response that provides the necessary information required to secure subsequent voice communications. For example, an encryption key for use in encrypting and decrypting voice communications to be sent from and received by caller 1's external device respectively may be transmitted by network server 30 to caller 1's external device (flow line 150*b*). Other parameters (e.g. data identifying the encryption algorithm to be used) may also be transmitted by network server 30 to caller 1's external device. Depending on the particular implementation, one or more data exchanges may be required to facilitate the setup of the secure connection. However, in any event, these data transmissions and exchanges are transparent to caller 1.

The "encryption key" transmitted by network server 30 to caller 1's external device for use in encrypting and decrypting voice communications may take various forms, depending on the particular implementation, as noted above with reference to FIG. 6I. In this example, the encryption key transmitted by server 30 to caller 1's external device is a symmetric session key that is to be used for the particular call being setup, either encrypted with a public key associated with caller 1 or his external device or via a secured connection (e.g. via a secure channel pre-established between caller 1's external device and a message management server, the message management server in turn being securely coupled to server 30). However, other features of the various embodiments described with reference to FIG. 6I may also be implemented and applied to scenario 150.

It will also be understood by persons skilled in the art that the key exchange shown at flow line 150*b* need not be performed immediately after the data associated with the incoming call is received by server 30 (flow line 150*a*). For example, in one embodiment, the key exchange may only take place after the call is actually "answered" or accepted by the party being called (or sent to voicemail). Alternatively, the key exchange depicted by flow line 150*b* may be performed contemporaneously with at least some of the steps taken to set up the call at the receiving party's endpoint, as described below.

Server 30 sends a call setup request data signal to the remote device 70 (flow line 140*c*) inquiring whether or not the user would like to accept the call. Remote device 70 may be a mobile device as described with reference to example embodiments previously described herein, or it may be another telephony device (e.g. a land based telephony device) that has been configured to secure voice communications in accordance with at least one embodiment described herein. The call setup request data signal will cause an audible, visual and/or vibrational indication to be activated on the remote device 70 (as set by a user or system preference). For example, the call setup request data signal may cause the remote device 70 to play a ring, ring tone or other suitable audible indication, and/or the call setup request data signal may cause the remote device 70 to display a textual or graphical message, pop-up or other visual notification (e.g. blinking LED on the device 70), as described earlier with reference to FIG. 6C. If the party receiving the call chooses to answer the call at the remote device 70, a call setup response answer data signal is returned to server 30 (flow line 150*d*). While the data transmitted in flow lines 150*c* and 150*d* may be encrypted, or flow via a pre-established secure channel, it may not be considered critical to secure these transmissions in certain implementations as no actual voice communication data or key information is being exchanged.

In response to the "answer" signal, server 30 then transmits a data signal back to remote device 70 that provides the necessary information required to secure subsequent voice communications between server 30 and remote device 70. For example, an encryption key for use in encrypting and decrypting voice communication data to be sent from and received by remote device 70 respectively may be securely transmitted by network server 30 to remote device 70 (flow line 150*e*). Other parameters (e.g. data identifying the encryption algorithm to be used) may also be transmitted by network server 30 to remote device 70. Depending on the particular implementation, one or more data exchanges may be required to facilitate the setup of the secure connection. However, in any event, these data transmissions and exchanges are transparent to the user of remote device 70.

The "encryption key" securely transmitted by network server 30 to remote device 70 for use in encrypting and decrypting voice communications may take various forms, depending on the particular implementation, as noted above with reference to flow line 150*b* and to FIG. 6I. In this example, the encryption key transmitted by server 30 to remote device 70 is a symmetric session key that is to be used for the particular call being set up, either encrypted with a public key associated with the user of remote device 70 or with the remote device 70, or via a secured connection (e.g. via a secure channel pre-established between remote device 70 and a message management server 1172, the message management server 1172 in turn being securely coupled to server 30). However, other features of the various embodiments as described with reference to FIG. 6I may also be implemented and applied to scenario 150.

In one embodiment, the same session key exchanged with caller 1's external device at flow line 150*b* may be exchanged with remote device 70 at flow line 150*e*. In another embodiment, the session key exchanged with caller 1's external device and server 30 is different from the session key exchange with remote device 70 and server 30, which may provide greater security.

Having completed the requisite key exchanges with both call endpoints (i.e. caller 1's external device and remote device 70 in this example), the server 30 will set up a voice call to the remote device 70 (voice signal flow line 150*f*) as well as to caller 1's external device (voice signal flow line 150*g*). Server 30 encrypts the data transmitted to caller 1's external device and remote device 70, for example, with the respective previously exchanged or identified session keys (e.g. flow lines 150*b*, 150*e*).

From the perspective of the parties involved in the subsequent conversation, it will appear that the server 30 will then substantially seamlessly connect the incoming call to the remote device 70. In controlling the subsequent conversation, voice communication data originating from caller 1's external device (flow line 150*i*) will be in encrypted form (e.g. having been encrypted with a session key exchanged at flow line 150*b*) when received at server 30. The server 30 may then relay the encrypted voice communication data to remote device 70 if server 30 exchanged the same session key with both remote device 70 and caller 1's external device. Alternatively, the server may decrypt encrypted voice communication data received from caller 1's external device with the appropriate encryption key (e.g. the session key exchanged at flow line 150*b*), and re-encrypt the voice communication data with a second encryption key (e.g. the session key exchanged with remote device 70 at flow line 150*e*) before transmitting the voice communication data to remote device 70.

Voice communication data originating from the remote device 70 (flow line 150*h*) will also be in encrypted form (e.g. having been encrypted with a session key exchanged at flow line 150*e*) when received at server 30. The server 30 may then relay the encrypted voice communication data to caller 1's external device if the same session key was exchanged by server 30 with both remote device 70 and caller 1's external device. Alternatively, the server 30 may decrypt encrypted voice communication data received from remote device 70 with the appropriate encryption key (e.g. the session key exchanged at flow line 15*eb*), and re-encrypt the voice communication data with another encryption key (e.g. the session key exchanged with caller 1's external device at flow line 150*b*) before transmitting the voice communication data to caller 1's external device.

In a variant embodiment, the key exchange performed at flow line 150*e* may be integrated with the call setup functions performed at flow lines 150*c* and 150*d*.

In a variant embodiment, peer-to-peer encrypted calls may be established via a different network server other than server 30 as described herein. For example, the functionality that is required to facilitate encrypted voice communications between an external device and either a remote device 70 or other telephony device may be implemented in a message management server (e.g. message management server 1172) or other wireless communication support component, or other computing device.

Where the incoming call originates from an external device such as a mobile telephone and is to be connected to a telephony device associated with a primary telephone number, at least some of the embodiments described herein allows the call to be connected with mobile devices and with non-mobile telephony devices within a secure domain (e.g. devices connected to a PBX in an enterprise network). The re-routing capabilities of embodiments described herein in which the system can selectively establish communications with one of a plurality of telephony devices associated with a particular telephone number, so that a user can take calls at a device deemed to be convenient to him for example, are integrated with the ability to securely communicate voice data for transmission over standard cellular networks.

Accordingly, it will be understood that the scenarios previously described with reference to FIG. 6C (deflecting an inbound call to voicemail), FIG. 6D (outgoing call scenarios), and FIGS. 6E to 6H (various call-in progress scenarios, including multiple party conferencing) can be modified to accommodate the features of embodiments described herein generally with respect to FIGS. 6I and 6J, in order to facilitate encrypted voice communications with at least one external device. In particular, where a call is to be connected to one or more external devices and voice communication data is to be secured, the data and voice flows of the above-mentioned scenarios can be modified such that at least one additional step of exchanging at least one encryption key with the one or more external devices is performed. Subsequently, voice communication data being sent to an external device by a network server (e.g. server 30) is encrypted. Voice communication data transmitted by an external device to the server is also encrypted. Voice communication data received by the network server (e.g. server 30) from an external device can be relayed in encrypted form to another device such as a mobile device, or alternatively, decrypted by the server. The decrypted voice communication data may be transmitted in decrypted form if it is being sent to a device that is not a mobile device, and that operates within the secure domain of an enterprise network. However, the server may re-encrypt the voice communication data if it is to be transmitted to a device operating outside of the secure domain of the enterprise network, such as another mobile device. Moreover, in example embodiments, incoming calls received at the network server from an external device may be typically in the form of a data signal, which comprises an indication that voice communications with the external device are to be secured.

Figure 7:
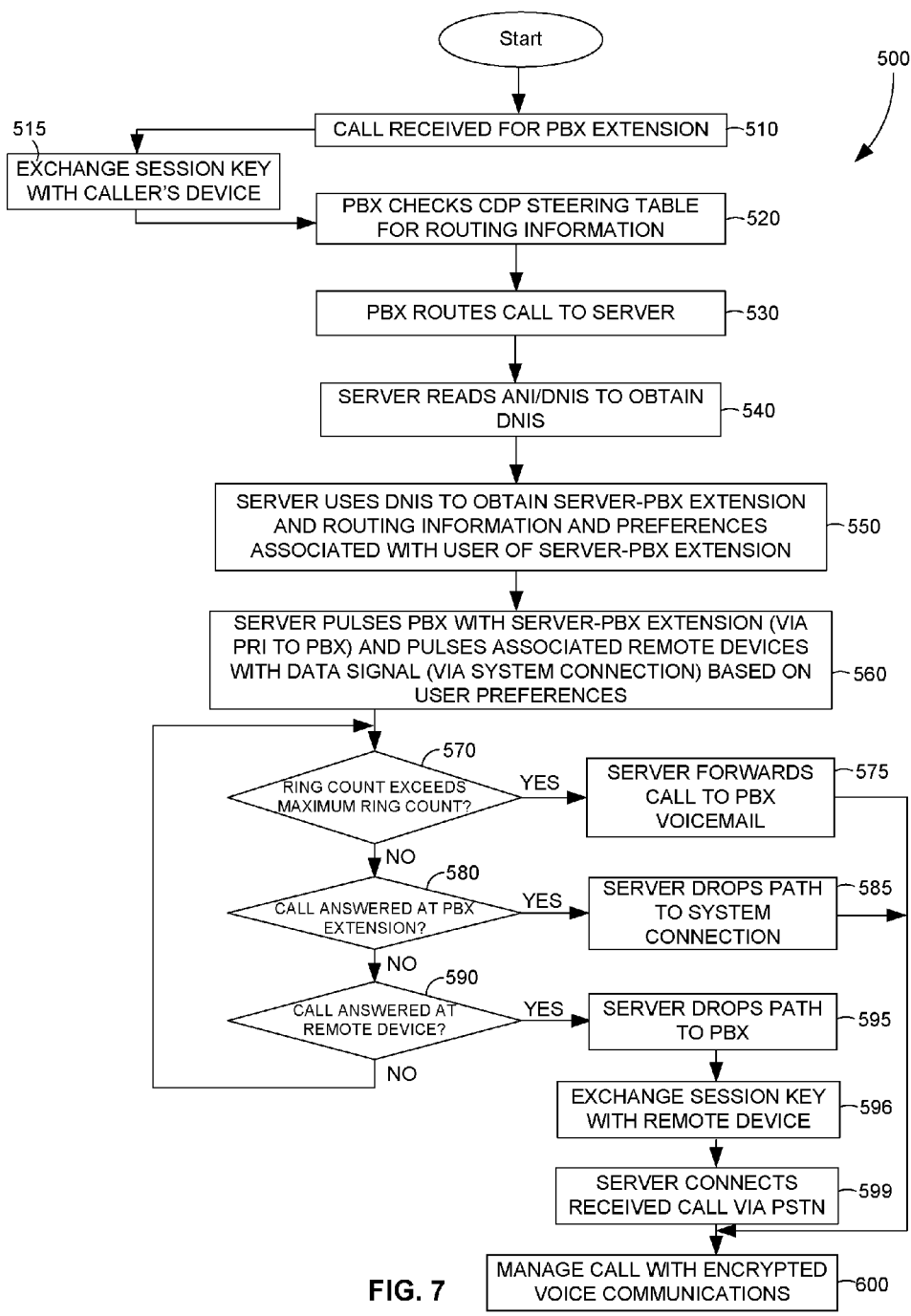
FIG. 7 illustrates in flowchart form an example of inbound station-to-station call processing performed in accordance with at least one embodiment.

Referring to FIG. 7, a flowchart illustrating an example of inbound station-to-station call processing performed in accordance with at least one embodiment is shown generally as 500. Some details with respect to some of the steps described with reference to FIG. 7 have been previously described with reference to earlier Figures, and have not been repeated here for ease of exposition.

As illustrated in FIG. 7, when an incoming station-to-station call (i.e., a direct extension call from one internal telephone device to another internal device) is received by the PBX 14 for an existing PBX extension (at 510), an encryption key (e.g. a session key), as described with reference to FIGS. 6I and 6J for example, is exchanged with the caller's external device (at 515). The caller's external device may be, for example, a mobile device. Although 515 is shown to immediately follow 510 in this example, it will be understood that 515 may be performed later in method 500, but prior to the transmission of voice communication data to or from the caller's external device.

The PBX 14 looks up the PBX extension in the CDP steering table (at 520) to determine where the call should be routed. Based on information in the CDP steering table, the call to the PBX extension is routed to the server 30 instead of being directly routed to an office telephone 12*a* (step 530).

As is known in the art, the incoming call will have automatic number identification (ANI) and dialed number identification service (DNIS) information. The ANI identifies the telephone number of the calling party and is traditionally used for "caller ID." DNIS identifies the telephone number of the called party. The server 30 reads the ANI/DNIS information from the incoming call to obtain the DNIS information (at 540). As noted above, the server 30 has assigned a new SERVER-PBX extension to each existing PBX extension. The SERVER-PBX extension and user preferences are obtained from database 270 through processor 250 by using the DNIS information as an index into the server 30 database 270 (at 550). Routing information will include caller information, any additional remote telephone numbers or voicemail box numbers, or other identification numbers of communication devices associated with the PBX extension. Examples of user preferences are given below.

At 560, the server 30 holds the incoming communication and pulses the PBX 14 through the PRI connection 22 between the server 30 and PBX 14 with the SERVER-PBX extension obtained in step 550. This causes the PBX 14 to ring the associated office telephone (e.g., telephone 12a). At the same time (if the user preferences indicate the desire), the server 30 attempts to contact one or more alternative remote communication devices (e.g., by initially sending a data signal to the remote device 70). In such an embodiment, the station-to-station call is thus routed to both the office telephone and also to at least one remote device 70 simultaneously or substantially simultaneously (or as determined by the user preferences).

Figure 7A:
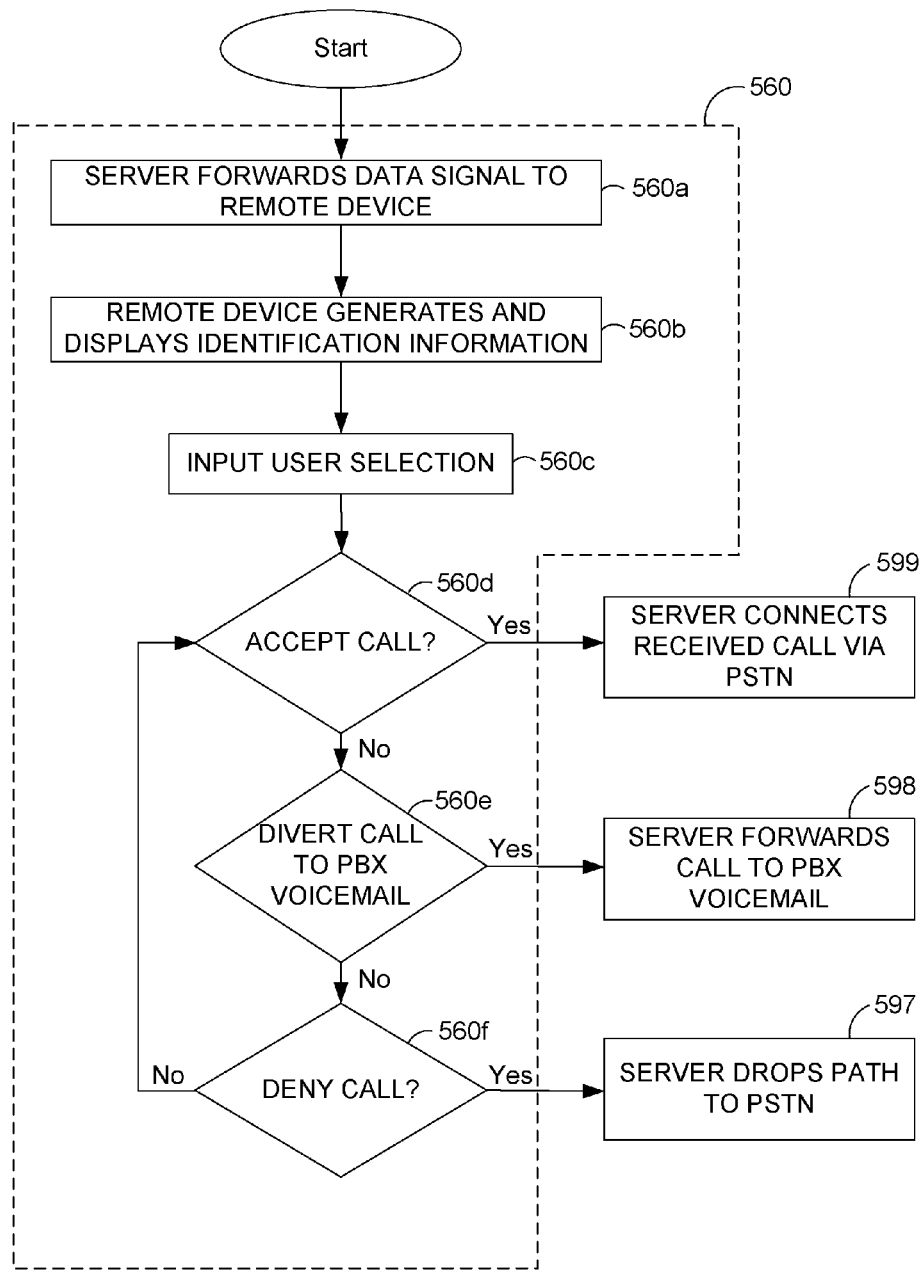
FIG. 7A further illustrates in flowchart form another example of inbound station-to-station call processing performed in accordance with at least one embodiment.

As shown in FIG. 7A, step 560 comprises multiple steps. When server 30 attempts to contact remote device 70 via system 480, the server 30 will forward a data signal (e.g., a call setup request) through system 480 to the remote device 70 (at 560a). The data signal carries the DNIS information to the remote device 70 to alert the receiving party that an incoming enterprise call is present and to provide its associated ANI/DNIS information. At 560b, remote device 70 generates identification information to display to a user. The user can then input a selection (at 560c) to choose to accept the call (at 560d), divert the call to voicemail (at 560e) or deny the call (at 560f). This choice is sent to the server via a data signal (see e.g., FIG. 6C). If the call is accepted, the server 30 connects the call to the user via the PSTN connection (at 599). If the call is diverted to voicemail, the server 30 forwards the call to the voicemail box associated with the called extension (at 598). If the call is denied by the user, the server drops the call path to the PSTN (via a user setting option on the remote device 70) (step 597). It should be appreciated that the remote device 70 can be programmed to automatically accept the call, divert the call to voicemail or deny the call based on the received ANI/DNIS information.

It should be noted that the illustrated processing method 500 is one example of how an incoming station-to-station call may be handled. Individual user preferences may alter the way the call is processed. It should be noted that in one example embodiment, the server 30 is signaling (and if accepted, calling) the remote device and pulsing the PBX 14 with the SERVER-PBX extension. This gives the server 30 control over the connections to the office telephone 12a and the remote device 70. It should also be noted that the server 30 can out dial (once the data signaling has occurred) several remote numbers, if so desired, and that embodiments should not be limited to the dialing of one remote number. One user preference, for example, can be to route the calls sequentially (enterprise phone first, then remote device, or vice versa). Another preference may be to always send the calls only to the remote device 70.

Referring again to FIG. 7, at step 570, it is determined if the current ring count (i.e., current number of rings) exceeds the maximum ring count defined by the user. Since the server 30 is controlling the call at this time it can track the number of rings. This may be done in several ways. For example, the server 30 may keep track of the number of rings using a timer that corresponds to the typical timing associated with the selected ring count. That is, if the user ring count is two, the server 30 checks to see if a time equivalent to the time it takes for two rings to occur has elapsed. If this time has elapsed, then the current "ring count" exceeds the maximum count defined by the user. The server 30 can instead, count the rings being sent to the extension if desired.

If the ring count exceeds the maximum ring count, then the server 30 (if desired and determined by a user preference) forwards the call to the enterprise's voicemail (at 575). If the ring count does not exceed the maximum ring count, the server 30 determines if the call is answered at the PBX extension (at 580). The PBX 14 will issue an off-hook message to the server 30 if the appropriate office telephone is answered. If it is determined that the call is answered at the PBX extension, the server 30 drops the call's path to the remote device via the system 420 and maintains the path to the PBX 14 (at 585).

If at 590, it is determined that the remote device was answered by the user, the server 30 drops the SERVER-PBX extension path to the PBX (at 595) and initiates the connection between the calling party and the remote device (at 599) via the PSTN after exchanging an encryption key (e.g. a session key) with the remote device (at 596) to be used to encrypt subsequent voice communications. Server 30 will substantially seamlessly connect the incoming call to remote device 70 via the PSTN connection.

The flow of method steps continues to 600, where the call comprising encrypted voice communications is managed by a network server. Whenever voice communication data is being sent to a mobile device by a network server (e.g. server 30), that data is encrypted. In operation, voice communication data that is transmitted by a mobile device (whether it be the caller's external device or the remote device 70 to which server 30 routed the incoming call) to the network server will be encrypted. Voice communication data received by the network server from a mobile device can be relayed in encrypted form (e.g. to another mobile device), or alternatively, decrypted by the server. The decrypted voice communication data may be transmitted in decrypted form if it is being sent to a device that is not a mobile device and that operates within the secure domain of an enterprise network (e.g. if the call was determined to be answered at a PBX extension at 580, or if it is to be forwarded to a PBX voicemail within the secure domain at 575). However, the server may re-encrypt the voice communication data if it is to be transmitted to an external device operating outside of the secure domain of the enterprise network, such as another mobile device for example.

In accordance with at least one example embodiment, it may be desired that the call to the remote device is actually answered by the user and not by a service of the wireless carrier. In known systems, wireless carriers often answer a call if there is a bad connection, the wireless channels are overloaded or for other reasons (such as initiating a wireless carrier's answering service). When the wireless carrier answers the call in these situations, the call would appear to server 30 as an "answered call" even if the remote user did not answer the call itself.

One way to distinguish a user answered call from a wireless service answered call is to prompt the user to transmit an acknowledgement signal such as a dual tone multi-frequency (DTMF) tone to the server 30 via the keypad of the remote device. Upon detecting the answered call, server 30 can send a voice message instructing the user to e.g., "press 1 to complete the call or press 2 to send caller to voicemail." If the DTMF tone is not received, then the server 30 presumes that the call was answered by the wireless carrier, or that the user does not want to answer the call which the server 30 treats as an unanswered call.

If the incoming call is deflected to voicemail, server 30 will connect the incoming call to an on-server or PBX voicemail box associated with the PBX extension. If the incoming call is denied, the call will be disconnected by server 30. If the call is not answered at the remote device at 590, the process flow returns to 570 to check whether the ring count has exceeded the maximum ring count. It should be noted that, if desired, the server 30 can play an interactive menu to the calling party, which allows the calling party to page the called party, leave a voicemail message or to transfer to an operator.

In accordance with an example embodiment, the database of server 30 may also contain numerous system-defined user access rights and user modifiable preferences, which can alter the call processing of the embodiments described herein. An office administrator may use the network computers 42a, 42b or a remote administration device 52 to set user access rights and priorities. The user may use the remote administration device 52 to set numerous user preferences. It is desirable that a Web-based or graphical user interface be used so that the user can easily access and set user preferences. The network computers 42a, 42b (or remote device 52) may also be used by the user if so desired.

Many enterprises have already provided wireless communications devices to their personnel. These wireless devices already have existing telephone numbers and are external to the enterprise PBX. Since the devices are already in use by personnel and their clients, the enterprise does not want to change their telephone numbers. There is a need to integrate these telephone numbers into the enterprise PBX. One way to integrate these telephone numbers would be to forward their unanswered calls to the voicemail. This can be accomplished by at least some embodiments described herein whether the wireless telephone number is associated with a PBX extension or not.

For example, the enterprise can purchase additional DID telephone numbers from the telephone company (if necessary). These additional DID telephone numbers are stored in the database of the server 30 together with special routing instructions to route all calls directly to a user's voicemail box (or other destination as desired). The user of a wireless telephone can program the wireless telephone to forward unanswered calls to his associated DID telephone number. Alternatively, the user can have the wireless carrier forward unanswered calls to the DID telephone number as well. This way, any unanswered call to the wireless telephone will be forwarded to the server 30, which resolves the DID and forwards the call to the appropriate voicemail box. Using this feature, the likelihood is increased that the user will retrieve his messages since he can retrieve all of his messages through the voicemail. This also alleviates the need for the user to have a separate voicemail service from the wireless carrier, which may reduce the cost of the wireless service.

Embodiments described herein may be utilized in any number of different applications. One embodiment, for example, applies to a hotel having a large number of rooms with dedicated phones lines for each room to provide a second or "virtual phone line" without routing additional telephone lines or other wiring to the room. Each room would have the original hard-wired telephone extension that is connected to the enterprise PBX, as well as a wireless device (e.g., telephone or PDA) associated with the PBX extension serving as a second or virtual telephone line. If, for example, a guest of the hotel were using the hard-wired telephone line for his personal computer, he could still make and receive calls through the PBX with the wireless device. Thus, at least some of the embodiments may allow an enterprise to double its telephone lines without incurring the expense of additional wiring required to install a second line for the hotel rooms.

It should be appreciated that the system could utilize "voice over IP" communications (i.e., voice over a data network) with appropriate remote devices. Many of today's wireless telephones and PDA's have the ability to place and receive cellular and data (voice over IP) telephone calls and to access the Internet or other data network. It should be appreciated that any conventional remote device could be used with system.

Figure 8:
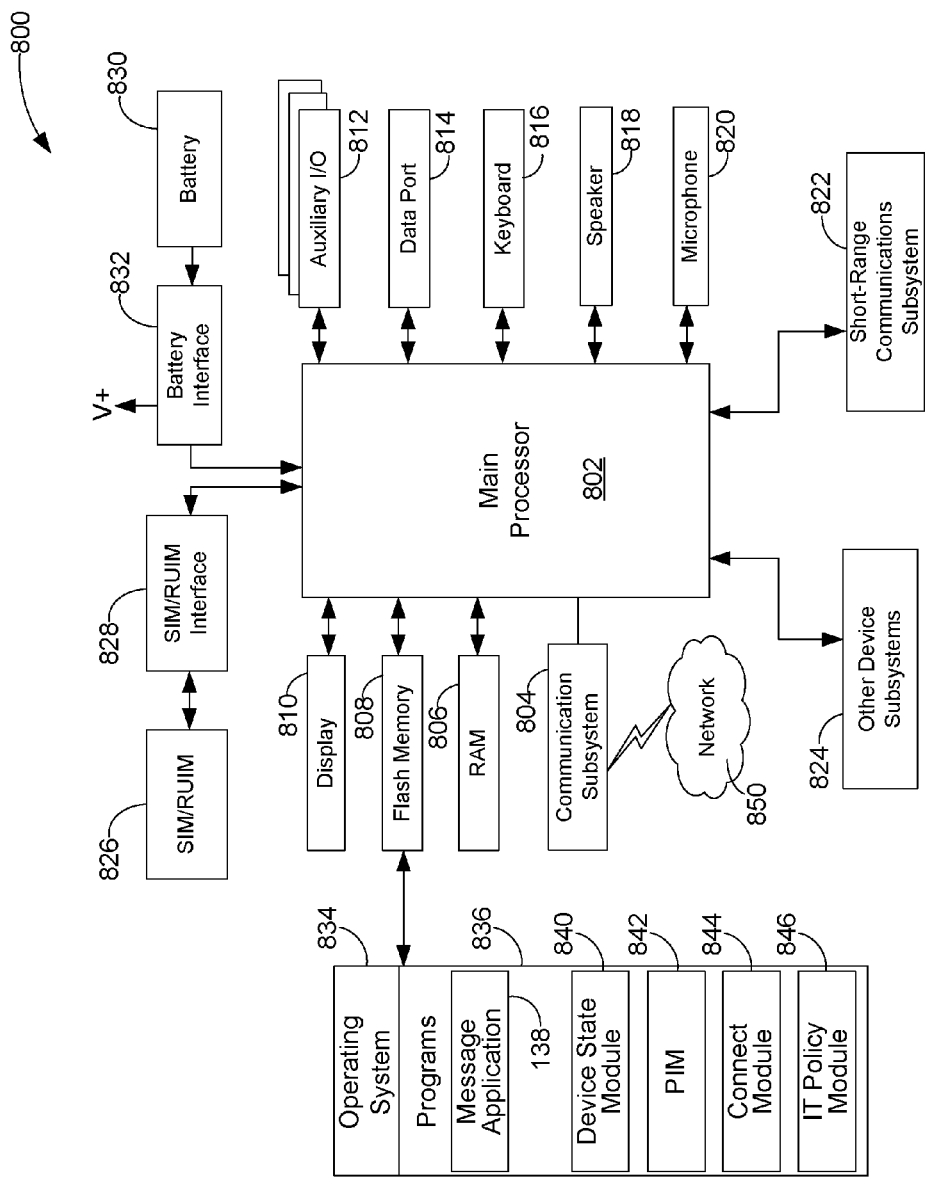
FIG. 8 is a block diagram of an example mobile device constructed in accordance with at least one embodiment.

In at least one example embodiment, remote device 70 can be implemented as mobile device 800, illustrated in FIG. 8. An external device from which an incoming call is received or to which an outgoing call is placed as previously described may also be a mobile device 800, as illustrated in FIG. 8.

Mobile device 800 may be a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device 800 and how it communicates with other devices and host systems, reference will now be made to FIGS. 8 through 11.

Referring to FIG. 8, shown therein is a block diagram of an example embodiment of a mobile device 800. The mobile device 800 includes a number of components such as a main processor 802 that controls the overall operation of the mobile device 800. Communication functions, including data and voice communications, are performed through a communication subsystem 804. The communication subsystem 804 may receive messages from and sends messages to a wireless network 850. In an example embodiment of the mobile device 800, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS communications. With newer network protocols, these channels may be capable of supporting both circuit switched voice communications and packet switched data communications.

Although the wireless network 850 associated with mobile device 800 is a GSM/GPRS wireless network in one example implementation, other wireless networks may also be associated with the mobile device 800 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 802 may also interact with additional subsystems such as a Random Access Memory (RAM) 806, a flash memory 808, a display 810, an auxiliary input/output (I/O) subsystem 812, a data port 814, a keyboard 816, a speaker 818, a microphone 820, short-range communications subsystem 822 and other device subsystems 824.

Some of the subsystems of the mobile device 800 may perform communication-related functions, whereas other subsystems may provide "resident" or on-device functions. By way of example, the display 810 and the keyboard 816 may be used for both communication-related functions, such as entering a text message for transmission over the network 850, and device-resident functions such as a calculator or task list.

The mobile device 800 can send and receive communication signals over the wireless network 850 after required network registration or activation procedures have been completed. Network access is associated with a subscriber or user of the mobile device 800. To identify a subscriber, the mobile device 800 may require a SIM/RUIM card 826 (i.e. Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the mobile device 800 and to personalize the mobile device 800, among other things. Without the SIM card 826, the mobile device 800 may not be fully operational for communication with the wireless network 850. By inserting the SIM card/RUIM 826 into the SIM/RUIM interface 828, a subscriber may access all subscribed services. Services may include, without limitation: web browsing and messaging such as e-mail, voicemail, Short Message Service (SMS), and Multimedia Messaging Services (MMS). More advanced services may include, without limitation: point of sale, field service and sales force automation. The SIM card/RUIM 826 may include a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber need not be necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

The mobile device 800 may be a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the mobile device 800. Although current technology makes use of a battery, future technologies such as micro fuel cells may provide the power to the mobile device 800. In some embodiments, mobile device 800 may be solar-powered.

The mobile device 800 may include an operating system 834 and software components 836 to 846 which are described in more detail below. The operating system 834 and the software components 836 to 846 that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the mobile device 800 during its manufacture. Other software applications include a message application 838 that can be any suitable software program that allows a user of the mobile device 800 to send and receive electronic messages. Various alternatives exist for the message application 838 as is well known to those skilled in the art. Messages that have been sent or received by the user are typically stored in the flash memory 808 of the mobile device 800 or some other suitable storage element in the mobile device 800. In at least some embodiments, some of the sent and received messages may be stored remotely from the device 800 such as in a data store of an associated host system that the mobile device 800 communicates with.

The software applications can further include a device state module 840, a Personal Information Manager (PIM) 842, and other suitable modules (not shown). The device state module 840 provides persistence, i.e. the device state module 840 ensures that important device data is stored in persistent memory, such as the flash memory 808, so that the data is not lost when the mobile device 800 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality may create a mirrored host computer on the mobile device 800 with respect to such items. This may be particularly advantageous when the host computer system is the mobile device subscriber's office computer system.

The mobile device 800 also includes a connect module 844, and an IT policy module 846. The connect module 844 implements the communication protocols that are required for the mobile device 800 to communicate with the wireless infrastructure and any host system, such as an enterprise system, that the mobile device 800 is authorized to interface with. Examples of a wireless infrastructure and an enterprise system are given in FIGS. 10 and 11, which are described in more detail below.

The connect module 844 includes a set of APIs that can be integrated with the mobile device 800 to allow the mobile device 800 to use any number of services associated with the enterprise system. The connect module 844 allows the mobile device 800 to establish an end-to-end secure, authenticated communication pipe with the host system. A subset of applications for which access is provided by the connect module 844 can be used to pass IT policy commands from the host system to the mobile device 800. This can be done in a wireless or wired manner. These instructions can then be passed to the IT policy module 846 to modify the configuration of the device 800. Alternatively, in some cases, the IT policy update can also be done over a wired connection.

The IT policy module 846 receives IT policy data that encodes the IT policy. The IT policy module 846 then ensures that the IT policy data is authenticated by the mobile device 800. The IT policy data can then be stored in the flash memory 806 in its native form. After the IT policy data is stored, a global notification can be sent by the IT policy module 846 to all of the applications residing on the mobile device 800. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT Policy may be coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Other types of software applications can also be installed on the mobile device 800. These software applications can be third party applications, which are added after the manufacture of the mobile device 800. Examples of third party applications include games, calculators, utilities, etc.

The additional applications can be loaded onto the mobile device 800 through at least one of the wireless network 850, the auxiliary I/O subsystem 812, the data port 814, the short-range communications subsystem 822, or any other suitable device subsystem 824. This flexibility in application installation increases the functionality of the mobile device 800 and may provide enhanced on-device functions, communication-related functions, or both. For example, secure communication applications may enable electronic commerce functions and other such financial transactions to be performed using the mobile device 800.

The data port 814 enables a subscriber to set preferences through an external device or software application and extends the capabilities of the mobile device 800 by providing for information or software downloads to the mobile device 800 other than through a wireless communication network. The alternate download path may, for example, be used to load an encryption key onto the mobile device 800 through a direct and thus reliable and trusted connection to provide secure device communication.

The data port 814 can be any suitable port that enables data communication between the mobile device 800 and another computing device. The data port 814 can be a serial or a parallel port. In some instances, the data port 814 can be a USB port that includes data lines for data transfer and a supply line that can provide a charging current to charge the battery 130 of the mobile device 800.

The short-range communications subsystem 822 provides for communication between the mobile device 800 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad. However, other types of keyboards may also be used. A composed item may be transmitted over the wireless network 850 through the communication subsystem 804.

For voice communications, the overall operation of the mobile device 800 may be substantially similar, except that the received signals are output to the speaker 818, and signals for transmission are generated by the microphone 820, for example. Alternative voice or audio I/O subsystems, such as a voice message recording subsystem, can also be implemented on the mobile device 800. Although voice or audio signal output is accomplished primarily through the speaker 818, the display 810 can also be used to provide additional information such as the identity of a calling party, duration of a voice call, or other voice call related information.

Figure 9:
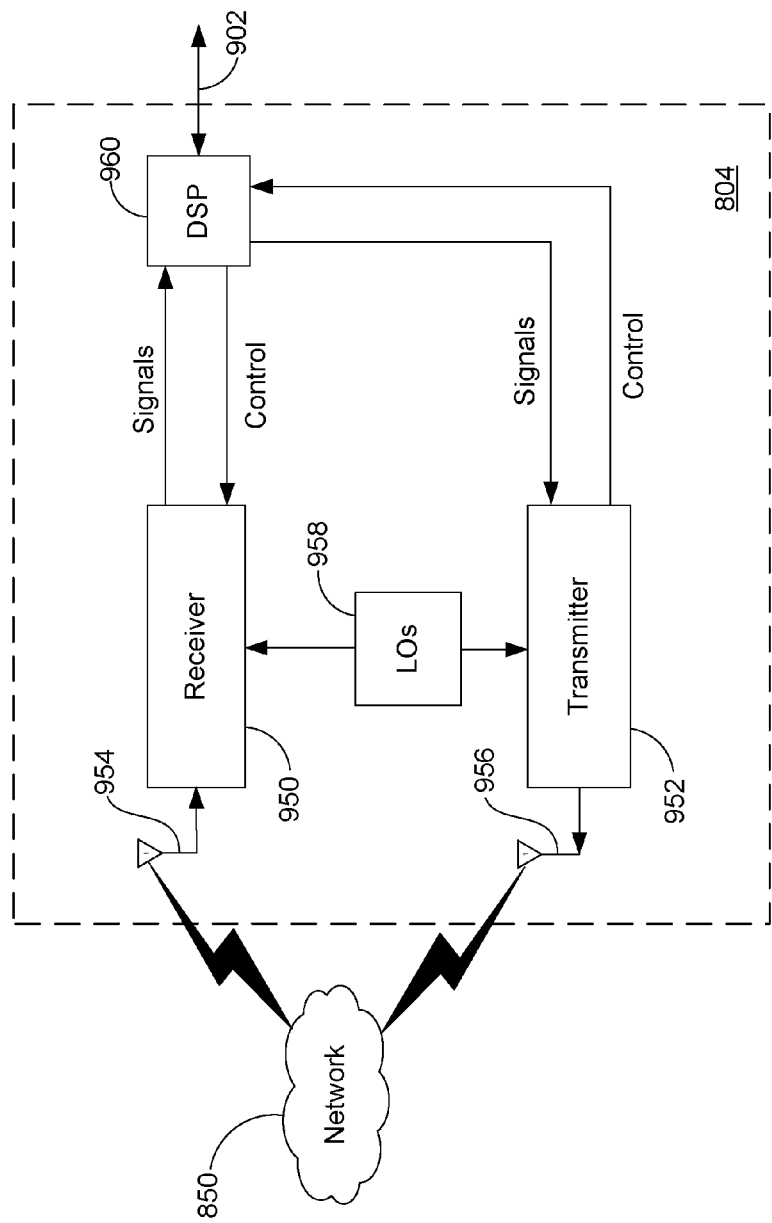
FIG. 9 is a block diagram of an example communication subsystem component of the mobile device in accordance with at least one embodiment.

Referring to FIG. 9, an example block diagram of the communication subsystem component 804 is shown. The communication subsystem 804 may include, for example, a receiver 950, a transmitter 952, as well as associated components such as one or more embedded or internal antenna elements 954 and 956, Local Oscillators (LOs) 958, and a processing module such as a Digital Signal Processor (DSP) 960. The particular design of the communication subsystem 804 may be dependent upon the communication network 850 with which the mobile device 800 is intended to operate. Thus, it should be understood that the design illustrated in FIG. 9 serves only as one example.

Signals received by the antenna 954 through the wireless network 850 are input to the receiver 950, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 960. In a similar manner, signals to be transmitted are processed, including modulation and encoding, by the DSP 960. These DSP-processed signals are input to the transmitter 952 for digital-to-analog (D/A) conversion, frequency up conversion, filtering, amplification and transmission over the wireless network 850 via the antenna 956. The DSP 960 not only processes communication signals, but may also provide for receiver and transmitter control. For example, the gains applied to communication signals in the receiver 950 and the transmitter 952 may be adaptively controlled through automatic gain control algorithms implemented in the DSP 960.

The wireless link between the mobile device 800 and the wireless network 850 can contain one or more different channels, typically different RF channels, and associated protocols used between the mobile device 800 and the wireless network 850. An RF channel is a limited resource that must be conserved, typically due to limits in overall bandwidth and limited battery power of the mobile device 800.

When the mobile device 800 is fully operational, the transmitter 952 is typically keyed or turned on only when it is transmitting to the wireless network 850 and is otherwise turned off to conserve resources. Similarly, the receiver 950 is periodically turned off to conserve power until it is needed to receive signals or information (if at all) during designated time periods.

Figure 10:
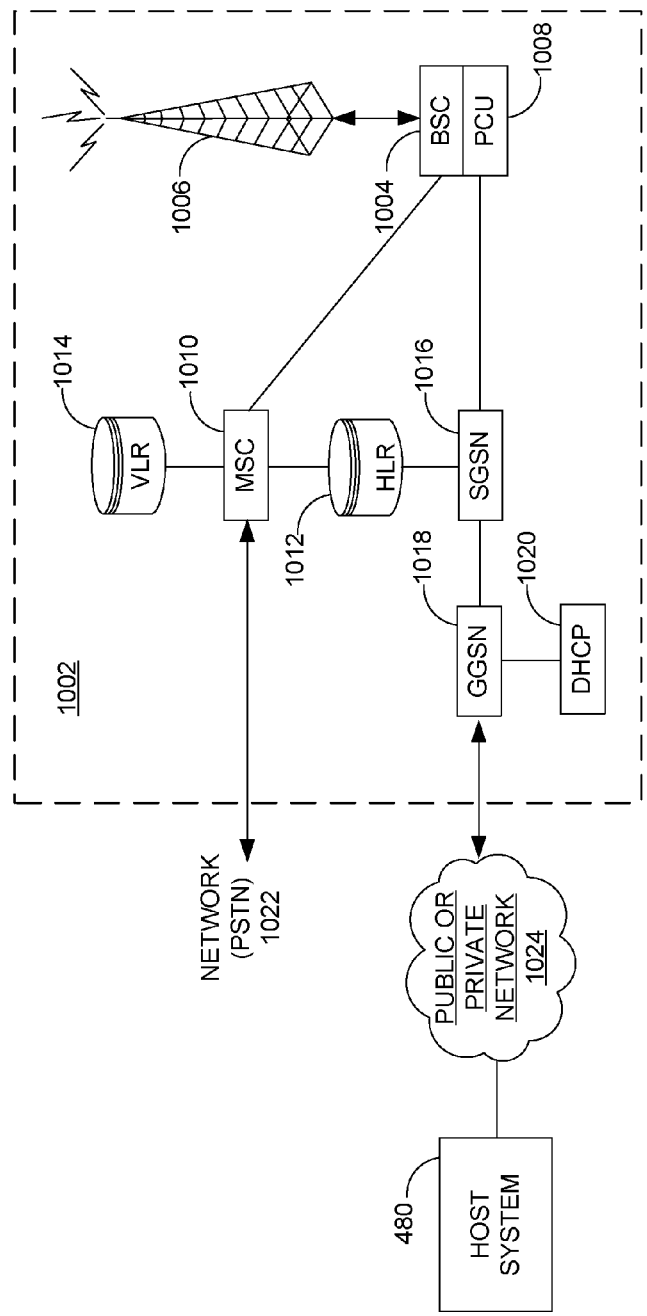
FIG. 10 is a block diagram of an example node of a wireless network in accordance with at least one embodiment.

Referring to FIG. 10, a block diagram of an example implementation of a node 1002 of the wireless network 850 is shown. In practice, the wireless network 850 comprises one or more nodes 1002. In conjunction with the connect module 844, the mobile device 800 can communicate with the node 1002 within the wireless network 850. In the example implementation of FIG. 10, the node 1002 is configured in accordance with General Packet Radio Service (GPRS) and Global Systems for Mobile (GSM) technologies. The node 1002 may include, for example, a base station controller (BSC) 1004 with an associated tower station 1006, a Packet Control Unit (PCU) 1008 added for GPRS support in GSM, a Mobile Switching Center (MSC) 1010, a Home Location Register (HLR) 1012, a Visitor Location Registry (VLR) 1014, a Serving GPRS Support Node (SGSN) 1016, a Gateway GPRS Support Node (GGSN) 1018, and a Dynamic Host Configuration Protocol (DHCP) 1020. This list of components is not meant to be an exhaustive list of the components of every node 1002 within a GSM/GPRS network, but rather a list of components that may be commonly used in communications through the network 850.

In a GSM network, the MSC 1010 may be coupled to the BSC 1004 and to a landline network, such as a Public Switched Telephone Network (PSTN) 1022 to satisfy circuit switched requirements. The connection through the PCU 1008, the SGSN 1016 and the GGSN 1018 to a public or private network (Internet) 1024 (also referred to herein generally as a shared network infrastructure) represents the data path for GPRS capable mobile devices. In a GSM network extended with GPRS capabilities, the BSC 1004 also contains the Packet Control Unit (PCU) 1008 that connects to the SGSN 1016 to control segmentation, radio channel allocation and to satisfy packet switched requirements. To track the location of the mobile device 800 and availability for both circuit switched and packet switched management, the HLR 1012 is shared between the MSC 1010 and the SGSN 1016. Access to the VLR 1014 is controlled by the MSC 1010.

The station 1006 may be a fixed transceiver station and together with the BSC 1004 form fixed transceiver equipment. The fixed transceiver equipment may provide wireless network coverage for a particular coverage area commonly referred to as a "cell". The fixed transceiver equipment transmits communication signals to and receives communication signals from mobile devices within its cell via the station 1006. The fixed transceiver equipment normally performs such functions as modulation and possibly encoding and/or encryption of signals to be transmitted to the mobile device 800 in accordance with particular, usually predetermined, communication protocols and parameters, under control of its controller. The fixed transceiver equipment similarly demodulates and possibly decodes and decrypts, if necessary, any communication signals received from the mobile device 800 within its cell. Communication protocols and parameters may vary between different nodes. For example, one node may employ a different modulation scheme and operate at different frequencies than other nodes.

For all mobile devices 800 registered with a specific network, permanent configuration data such as a user profile may be stored in the HLR 1012. The HLR 1012 may also contain location information for each registered mobile device and can be queried to determine the current location of a mobile device. The MSC 1010 may be responsible for a group of location areas and store the data of the mobile devices currently in its area of responsibility in the VLR 1014. Further, the VLR 1014 may also contain information on mobile devices that are visiting other networks. The information in the VLR 1014 may include part of the permanent mobile device data transmitted from the HLR 1012 to the VLR 1014 for faster access. By moving additional information from a remote HLR 1012 node to the VLR 1014, the amount of traffic between these nodes can be reduced so that voice and data services can be provided with faster response times and at the same time require less use of computing resources.

The SGSN 1016 and the GGSN 1018 are elements that may be added for GPRS support; namely packet switched data support, within GSM. The SGSN 1016 and the MSC 1010 may have similar responsibilities within the wireless network 850 by keeping track of the location of each mobile device 800. The SGSN 1016 may also perform security functions and access control for data traffic on the wireless network 800. The GGSN 1018 provides internetworking connections with external packet switched networks and connects to one or more SGSN's 216 via an Internet Protocol (IP) backbone network operated within the network 850. During normal operations, a given mobile device 800 must perform a "GPRS Attach" to acquire an IP address and to access data services. This feature may not be present in circuit switched voice channels as Integrated Services Digital Network (ISDN) addresses are used for routing incoming and outgoing calls. Currently, GPRS capable networks may use private, dynamically assigned IP addresses, thus requiring the DHCP server 1020 connected to the GGSN 1018. There are many mechanisms for dynamic IP assignment, including using a combination of a Remote Authentication Dial-In User Service (RADIUS) server and a DHCP server. Once the GPRS Attach is complete, a logical connection may be established from a mobile device 800, through the PCU 1008, and the SGSN 1016 to an Access Point Node (APN) within the GGSN 1018. The APN represents a logical end of an IP tunnel that can either access direct Internet compatible services or private network connections. The APN may also represent a security mechanism for the network 850, insofar as each mobile device 800 may be assigned to one or more APNs and mobile devices 800 may not exchange data without first performing a GPRS Attach to an APN that it has been authorized to use. The APN may be considered to be similar to an Internet domain name such as "myconnection.wireless.com".

Once the GPRS Attach operation is complete, a tunnel may be created and all traffic may be exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there may be a limited number of these available in the network 850. To maximize use of the PDP Contexts, the network 800 may run an idle timer for each PDP Context to determine if there is a lack of activity. When a mobile device 800 is not using its PDP Context, the PDP Context can be de-allocated and the IP address returned to the IP address pool managed by the DHCP server 1020.

Referring to FIG. 11, shown therein is a block diagram illustrating components of an example configuration of a host system 480 that the mobile device 800 can communicate with in conjunction with the connect module 844. The host system 480 will typically be a corporate enterprise or other local area network (LAN), but may also be a home office computer or some other private system, for example, in variant implementations. In this example shown in FIG. 11, the host system 480 is depicted as a LAN of an organization to which a user of the mobile device 800 belongs. Typically, a plurality of mobile devices can communicate wirelessly with the host system 480 through one or more nodes 1002 of the wireless network 850.

The host system 480 comprises a number of network components connected to each other by a network 1160. For instance, a user's desktop computer 1162*a* with an accompanying cradle 1164 for the user's mobile device 800 is situated on a LAN connection. The cradle 1164 for the mobile device 800 can be coupled to the computer 1162*a* by a serial or a Universal Serial Bus (USB) connection, for example. Other user computers 1162*b*-1162*n* are also situated on the network 1160, and each may or may not be equipped with an accompanying cradle 1164. The cradle 1164 facilitates the loading of information (e.g. PIM data, private symmetric encryption keys to facilitate secure communications) from the user computer 1162*a* to the mobile device 800, and may be particularly useful for bulk information updates often performed in initializing the mobile device 800 for use. The information downloaded to the mobile device 800 may include certificates used in the exchange of messages.

It will be understood by persons skilled in the art that the user computers 1162*a*-1162*n* will typically also be connected to other peripheral devices, such as printers, etc. which are not explicitly shown in FIG. 11. Furthermore, only a subset of network components of the host system 480 are shown in FIG. 11 for ease of exposition, and it will be understood by persons skilled in the art that the host system 480 will comprise additional components that are not explicitly shown in FIG. 11 for this example configuration. More generally, the host system 480 may represent a smaller part of a larger network (not shown) of the organization, and may comprise different components and/or be arranged in different topologies than that shown in the example embodiment of FIG. 11.

To facilitate the operation of the mobile device 800 and the wireless communication of messages and message-related data between the mobile device 800 and components of the host system 480, a number of wireless communication support components 1170 can be provided. In some implementations, the wireless communication support components 1170 can include a message management server 1172, a mobile data server 1174, a contact server 1176, and a device manager module 1178. The device manager module 1178 includes an IT Policy editor 1180 and an IT user property editor 1182, as well as other software components for allowing an IT administrator to configure the mobile devices 800. In an alternative embodiment, there may be one editor that provides the functionality of both the IT policy editor 1180 and the IT user property editor 1182. The support components 1170 may also include a data store 1184, and an IT policy server 1186. The IT policy server 286 may include, for example, a processor 1188, a network interface 1190 and a memory unit 1192. The processor 1188 controls the operation of the IT policy server 1186 and executes functions related to the standardized IT policy as described below. The network interface 1190 allows the IT policy server 1186 to communicate with the various components of the host system 480 and the mobile devices 800. The memory unit 1192 can store functions used in implementing the IT policy as well as related data. Those skilled in the art know how to implement these various components. Other components may also be included as is well known to those skilled in the art. Further, in some implementations, the data store 1184 can be part of any one of the servers.

In this example embodiment, the mobile device 800 communicates with the host system 480 through node 1002 of the wireless network 850 and a shared network infrastructure 1124 such as a service provider network or the public Internet. Access to the host system 480 may be provided through one or more routers (not shown), and computing devices of the host system 480 may operate from behind a firewall or proxy server 1166. The proxy server 1166 provides a secure node and a wireless internet gateway for the host system 480. The proxy server 1166 intelligently routes data to the correct destination server within the host system 480.

In some implementations, the host system 480 can include a wireless VPN router (not shown) to facilitate data exchange between the host system 480 and the mobile device 800. The wireless VPN router allows a VPN connection to be established directly through a specific wireless network to the mobile device 800. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 800 in this alternative implementation.

Messages intended for a user of the mobile device 800 are initially received by a message server 1168 of the host system 480. Such messages may originate from any number of sources. For instance, a message may have been sent by a sender from the computer 1162*b* within the host system 480, from a different mobile device (not shown) connected to the wireless network 850 or a different wireless network, or from a different computing device, or other device capable of sending messages, via the shared network infrastructure 1124, possibly through an application service provider (ASP) or Internet service provider (ISP), for example.

The message server 1168 typically acts as the primary interface for the exchange of messages, particularly e-mail messages, within the organization and over the shared network infrastructure 1124. Each user in the organization that has been set up to send and receive messages is typically associated with a user account managed by the message server 1168. Some example implementations of the message server 1168 include a Microsoft Exchange™ server, a Lotus Domino™ server, a Novell Groupwise™ server, or another suitable mail server installed in a corporate environment. In some implementations, the host system 480 may comprise multiple message servers 1168. The message server 1168 may also be adapted to provide additional functions beyond message management, including the management of data associated with calendars and task lists, for example.

When messages are received by the message server 1168, they are typically stored in a data store associated with the message server 1168. In at least some embodiments, the data store may be a separate hardware unit, such as data store 1184, that the message server 1168 communicates with. Messages can be subsequently retrieved and delivered to users by accessing the message server 1168. For instance, an e-mail client application operating on a user's computer 1162a may request the e-mail messages associated with that user's account stored on the data store associated with the message server 1168. These messages are then retrieved from the data store and stored locally on the computer 1162a. The data store associated with the message server 1168 can store copies of each message that is locally stored on the mobile device 800. Alternatively, the data store associated with the message server 1168 can store all of the messages for the user of the mobile device 800 and only a smaller number of messages can be stored on the mobile device 100 to conserve memory. For instance, the most recent messages (i.e., those received in the past two to three months for example) can be stored on the mobile device 800.

When operating the mobile device 800, the user may wish to have e-mail messages retrieved for delivery to the mobile device 800. The message application 838 operating on the mobile device 800 may also request messages associated with the user's account from the message server 1168. The message application 838 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 800 is assigned its own e-mail address, and messages addressed specifically to the mobile device 800 are automatically redirected to the mobile device 100 as they are received by the message server 268.

The message management server 1172 can be used to specifically provide support for the management of messages, such as e-mail messages, that are to be handled by mobile devices. Generally, while messages are still stored on the message server 1168, the message management server 1172 can be used to control when, if, and how messages are sent to the mobile device 800. The message management server 1172 also facilitates the handling of messages composed on the mobile device 800, which are sent to the message server 1168 for subsequent delivery.

For example, the message management server 1172 may monitor the user's "mailbox" (e.g. the message store associated with the user's account on the message server 1168) for new e-mail messages, and apply user-definable filters to new messages to determine if and how the messages are relayed to the user's mobile device 800. The message management server 1172 may also compress and encrypt new messages (e.g. using an encryption technique such as Data Encryption Standard (DES), Triple DES, or Advanced Encryption Standard (AES)) and push them to the mobile device 800 via the shared network infrastructure 1124 and the wireless network 850. The message management server 1172 may also receive messages composed on the mobile device 800 (e.g. encrypted using Triple DES), decrypt and decompress the composed messages, re-format the composed messages if desired so that they will appear to have originated from the user's computer 1162a, and re-route the composed messages to the message server 1168 for delivery.

Certain properties or restrictions associated with messages that are to be sent from and/or received by the mobile device 800 can be defined (e.g. by an administrator in accordance with IT policy) and enforced by the message management server 1172. These may include whether the mobile device 100 may receive encrypted and/or signed messages, minimum encryption key sizes, whether outgoing messages must be encrypted and/or signed, and whether copies of all secure messages sent from the mobile device 800 are to be sent to a pre-defined copy address, for example.

The message management server 1172 may also be adapted to provide other control functions, such as only pushing certain message information or pre-defined portions (e.g. "blocks") of a message stored on the message server 1168 to the mobile device 800. For example, in some cases, when a message is initially retrieved by the mobile device 800 from the message server 1168, the message management server 1172 may push only the first part of a message to the mobile device 800, with the part being of a pre-defined size (e.g. 2 KB). The user can then request that more of the message be delivered in similar-sized blocks by the message management server 1172 to the mobile device 800, possibly up to a maximum pre-defined message size. Accordingly, the message management server 1172 facilitates better control over the type of data and the amount of data that is communicated to the mobile device 800, and can help to minimize potential waste of bandwidth or other resources.

The mobile data server 1174 may encompass any other server that stores information that is relevant to the corporation. The mobile data server 1174 may include, but is not limited to, databases, online data document repositories, customer relationship management (CRM) systems, or enterprise resource planning (ERP) applications.

The contact server 1176 can provide information for a list of contacts for the user in a similar fashion as the address book on the mobile device 100. Accordingly, for a given contact, the contact server 1176 can include the name, phone number, work address and e-mail address of the contact, among other information. The contact server 1176 can also provide a global address list that contains the contact information for all of the contacts associated with the host system 480.

It will be understood by persons skilled in the art that the message management server 1172, the mobile data server 1174, the contact server 1176, the device manager module 1178, the data store 1184 and the IT policy server 1186 do not need to be implemented on separate physical servers within the host system 480. For example, some or all of the functions associated with the message management server 1172 may be integrated with the message server 268, or some other server in the host system 480. Alternatively, the host system 480 may comprise multiple message management servers 1172, particularly in variant implementations where a large number of mobile devices need to be supported.

Alternatively, in some embodiments, the IT policy server 1186 can provide the IT policy editor 1180, the IT user property editor 1182 and the data store 1184. In some cases, the IT policy server 1186 can also provide the device manager module 1178. The processor 1188 can execute the editors 1180 and 1182. In some cases, the functionality of the editors 1180 and 1182 can be provided by a single editor. In some cases, the memory unit 1192 can provide the data store 1184.

The device manager module 1178 provides an IT administrator with a graphical user interface with which the IT administrator interacts to configure various settings for the mobile devices 800. As mentioned, the IT administrator can use IT policy rules to define behaviors of certain applications on the mobile device 800 that are permitted such as phone, web browser or Instant Messenger use. The IT policy rules can also be used to set specific values for configuration settings that an organization requires on the mobile devices 800 such as auto signature text, WLAN/VoIP/VPN configuration, security requirements (e.g. encryption algorithms, password rules, etc.), specifying themes or applications that are allowed to run on the mobile device 800, and the like.

In a variant embodiment, priority preemption to any device associated with the server 30 used in the enterprise network may be implemented. This includes any voice, data and/or satellite devices associated with a telephone number of the enterprise network. This allows priority users to preempt existing communications and communicate with certain individuals even though that individual is using a wireless telephone or other remote device. To implement this priority preemption feature, the server 30 should be programmed to recognize a special dialing pattern, data message or other input from one of the many devices that the high priority user may be using. This unique pattern whether it is a dialing pattern, data message or other input is referred to herein as the preemption signal. The priority preemption signal precedes a telephone number in which the high priority user wishes to call. If the individual associated with the telephone number is already on another call, then the priority preemption may be invoked as follows.

Figure 12:
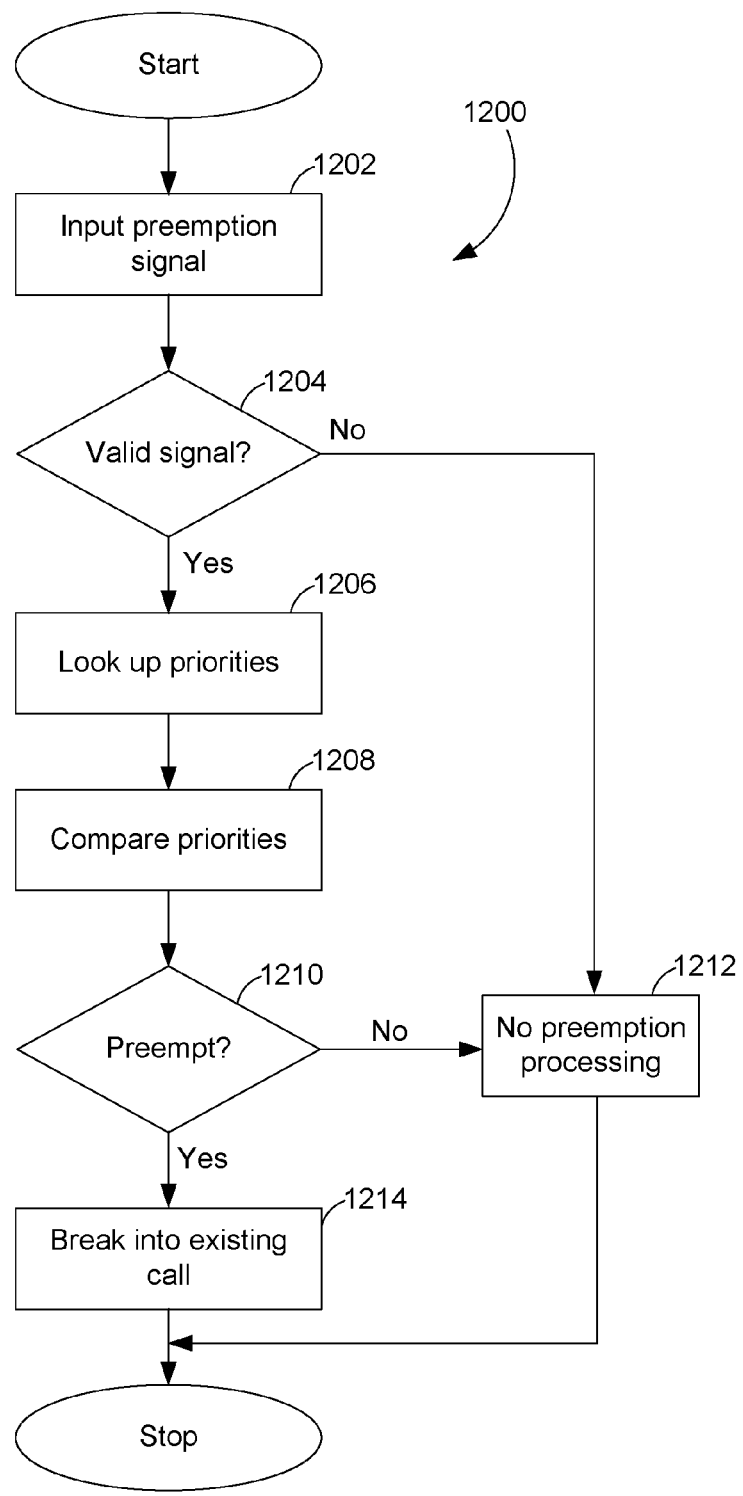
FIG. 12 illustrates an example of priority preemption processing performed by at least one embodiment.

FIG. 12 illustrates an example of priority preemption processing 1200 performed in a variant embodiment. The processing 1200 begins when the server unit detects a preemption signal and a dialed telephone number (at 1202). The server unit checks the preemption signal to determine if it is a valid signal (at 1204). If valid, the server unit uses the signal to determine the priority of the caller, the individual associated with the dialed telephone number, and if possible, the priority of the individual on the active call (at 1206). The server 30 compares the priorities to determine if the person attempting to preempt the call has the highest priority (at 1210) and if so, sends a data signal through system 420 to the remote device (at 1214). If the remote device accepts the preemption, server 30 will withdraw the connected call from the remote device and connect the new priority call through the PSTN connection. Due to the flexibility of the server unit, priority preemption may be implemented using DTMF, IVR, web based or micro-browser communications.

If the person attempting to preempt the call does not have the highest priority (at 1210) or if the preemption signal is invalid (at 1204), then additional call processing may be performed (at 1212). This additional processing may be a prompt, voice or text message or other alert to the caller to indicate that the preemption cannot occur at this time. The processing may also include a menu of options in which the caller can choose to leave a message, try again, or merely hang up. It should be appreciated that priority preemption may be implemented in any manner desired by the enterprise and that variant embodiments may employ different steps than those illustrated in FIG. 12.

While various embodiments have been specifically described and illustrated herein, it should be apparent to persons skilled in the art that modifications to the embodiments and implementations might be made without departing from the spirit or scope of the embodiments described herein. For example, while embodiments illustrated herein have been generally directed to the processing of voice (packet or circuit switched) calls, it should be readily apparent that any form of call (e.g., audio, video, data) may be processed through server 30 to any communication device (e.g., cellular phone, pager, office/residential landline telephone, computer terminal, personal digital assistant (PDA), other mobile or handheld device, etc.). Certain method steps of the example operational flows illustrated in FIGS. 6A-7A might be interchanged in order, combined, replaced or even added to without departing from the scope of the embodiments described herein. Moreover, the method steps may be performed by hardware, software, firmware or any combinations of hardware, software, firmware or logic elements.

The acts of the methods and flows described herein may be provided as executable software instructions stored on computer-readable storage media.

The acts of the methods and flows described herein may be provided as executable software instructions stored on transmission-type media.

In addition, while the illustrated embodiments have demonstrated implementations using PBX-based communication systems, it should be readily apparent that the server module may be connected (directly, indirectly, co-located, or remotely) with any other network switching device or communication system used to process calls such as a central switching office, centrex system, or Internet server for telephone calls made over the public switched telephone network, private telephone networks, or even Internet Protocol (IP) telephony networks made over the Internet. It should be understood by those skilled in the art that the embodiments described herein do not need a PBX to operate or to perform any of the processing illustrated in FIGS. 6A-7A.

It should be apparent that, where PRI lines (e.g., between PBX 14 and server 30, between PBX 14 and PSTN 16) have been illustrated in discussing certain embodiments herein, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be employed. For example, it should be noted that the server 30 could trunk back to the PBX 14 instead of being directly connected to the PSTN 54. The use of a commercial wireless carrier network (represented by wireless switch 58 and antenna 60) as described herein may be implemented using one or more commercial carriers using the same or different signaling protocols (e.g., Sprint/Nextel, etc.) depending on the communication devices registered with the system.

The modules described herein such as the modules making up server 30, as well as server 30 and PBX 14 themselves, may be one or more hardware, software, or hybrid components residing in (or distributed among) one or more local or remote systems. It should be readily apparent that the modules may be combined (e.g., server 30 and PBX 14) or further separated into a variety of different components, sharing different resources (including processing units, memory, clock devices, software routines, etc.) as required for the particular implementation of the embodiments disclosed herein. User interface devices utilized by in or in conjunction with server 30 may be any device used to input and/or output information. The interface devices may be implemented as a graphical user interface (GUI) containing a display or the like, or may be a link to other user input/output devices known in the art.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components.

The invention claimed is:

1. A method for facilitating encrypted voice communications, the method comprising:
- detecting at a network server an incoming telephone call to a primary telephone number from an external device operating outside an enterprise network, the primary telephone number associated with a remote device operating outside the enterprise network and with a telephony device operating within the enterprise network;
- contacting both the remote device and the telephony device to route the incoming telephone call;
- determining which of the remote device or the telephony device was answered; and
- in response to detecting that the remote device was answered:
  - the network server transmitting a session key to the remote device via a data connection path between the remote device and the network server;
  - the network server transmitting the session key to the external device via a data connection path between the external device and the network server;
  - the network server connecting the incoming telephone call to the remote device via a first voice connection path between the network server and the external device, and via a second voice connection path between the network server and the remote device;
  - the network server receiving from the remote device encrypted first voice communication signals via the second voice connection path, the encrypted first voice communication signals having been encrypted by the remote device using the session key, and relaying the encrypted first voice communication signals to the external device via the first voice connection path; and
  - the network server receiving from the external device encrypted second voice communication signals via the first voice connection path, the encrypted second voice communication signals having been encrypted by the external device using the session key, and relaying the encrypted second voice communication signals to the remote device via the second voice connection path.

2. The method of claim 1, wherein the external device comprises a mobile device.

3. The method of claim 1, wherein transmitting the session key to the external device comprises transmitting the session key encrypted with a public key associated with the external device.

4. The method of claim 1, wherein transmitting the session key to the external device comprises transmitting the session key via a message management server.

5. The method of claim 1, wherein contacting the remote device comprises:
- retrieving a first connection number for the remote device;
- transmitting a first data signal to the remote device via a data connection path between the network server and the remote device, the first data signal inquiring whether the incoming call is to be accepted at the remote device; and
- receiving a second data signal from the remote device, wherein determining whether the remote device was answered is based on the second data signal.

6. The method of claim 1, wherein the remote device comprises a mobile device.

7. The method of claim 1, wherein the remote device comprises a land-based telephony device.

8. The method of claim 1, wherein if the incoming telephone call is not accepted, the method further comprises diverting the incoming call to an enterprise voicemail box associated with the primary telephone number.

9. The method of claim 1, further comprising performing user authentication for the remote device.

10. The method of claim 1, wherein transmitting the session key to the remote device comprises transmitting the session key encrypted with a public key associated with the remote device.

11. An apparatus for facilitating encrypted voice communications, the apparatus comprising:
- a computer readable storage medium, the computer readable storage medium for storing telephone numbers associated with a primary telephone number; and
- a processor coupled to the computer readable storage medium, the processor adapted to perform acts of a method comprising:
- detecting at a network server an incoming telephone call to the primary telephone number from an external device operating outside an enterprise network, the primary telephone number associated with a remote device operating outside the enterprise network and with a telephony device operating within the enterprise network;
- contacting both the remote device and the telephony device to route the incoming telephone call;
- determining which of the remote device or the telephony device was answered; and
- in response to detecting that the remote device was answered:
  - transmitting a session key to the remote device via a data connection path between the remote device and the network server;
  - transmitting the session key to the external device via a data connection path between the external device and the network server;
  - connecting the incoming telephone call to the remote device via a first voice connection path between the network server and the external device, and via a second voice connection path between the network server and the remote device;
  - receiving from the remote device encrypted first voice communication signals via the second voice connection path at the network server, the encrypted first voice communication signals having been encrypted by the remote device using the session key, and relaying the first voice communication signals to the external device via the first voice connection path; and
  - receiving from the external device second voice communication signals via the first voice connection path at the network server, the encrypted second voice communication signals having been encrypted by the external device using the session key, and relaying the encrypted second voice communication signals to the remote device via the second voice connection path.

12. The apparatus of claim 11, wherein transmitting the session key to the external device comprises transmitting the session key encrypted with a public key associated with the external device.

13. The apparatus of claim 11, wherein transmitting the session key to the external device comprises transmitting the session key via a message management server.

14. The apparatus of claim 11, wherein transmitting the session key to the remote device comprises transmitting the session key encrypted with a public key associated with the remote device.

15. A system for facilitating encrypted voice communications, the system comprising a processor configured to perform acts comprising:

detecting at a network server an incoming telephone call to a primary telephone number from an external device operating outside an enterprise network, the primary telephone number associated with a remote device operating outside the enterprise network and with a telephony device operating within the enterprise network;

contacting both the remote device and the telephony device to route the incoming telephone call;

determining which of the remote device or the telephony device was answered; and in response to detecting that the remote device was answered:

transmitting a session key to the remote device via a data connection path between the remote device and the network server;

transmitting the session key to the external device via a data connection path between the external device and the network server;

connecting the incoming telephone call to the remote device via a first voice connection path between the network server and the external device, and via a second voice connection path between the network server and the remote device;

receiving from the remote device encrypted first voice communication signals via the second voice connection path at the network server, the encrypted first voice communication signals having been encrypted by the remote device using the session key, and relaying the encrypted first voice communication signals to the external device via the first voice connection path; and receiving from the external device encrypted second voice communication signals via the first voice connection path, the encrypted second voice communication signals having been encrypted by the external device using the session key, and relaying the encrypted second voice communication signals to the remote device via the second voice connection path.

* * * * *